(12) United States Patent
Sun et al.

(10) Patent No.: US 10,276,168 B2
(45) Date of Patent: Apr. 30, 2019

(54) VOICEPRINT VERIFICATION METHOD AND DEVICE

(71) Applicant: Tencent Technology (Shenzhen) Company Limited, Shenzhen, Guangdong (CN)

(72) Inventors: Xiao Sun, Shenzhen (CN); Zongzhuo Wu, Shenzhen (CN); Qiang Long, Shenzhen (CN); Ling Li, Shenzhen (CN); Lifang Cen, Shenzhen (CN); Xiang Zhang, Shenzhen (CN); Runjia Huang, Shenzhen (CN); Hui Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 2 days.

(21) Appl. No.: 15/375,673

(22) Filed: Dec. 12, 2016

(65) Prior Publication Data

US 2017/0092276 A1    Mar. 30, 2017

Related U.S. Application Data

(63) Continuation of application No. PCT/CN2015/090505, filed on Sep. 24, 2015.

(30) Foreign Application Priority Data

Jul. 31, 2014 (CN) .......................... 2014 1 0373815
Aug. 8, 2014 (CN) .......................... 2014 1 0388869
Aug. 8, 2014 (CN) .......................... 2014 1 0389788

(51) Int. Cl.
*G10L 17/04* (2013.01)
*G10L 15/07* (2013.01)
(Continued)

(52) U.S. Cl.
CPC .............. *G10L 17/08* (2013.01); *G10L 15/30* (2013.01); *G10L 17/02* (2013.01); *G10L 17/22* (2013.01);
(Continued)

(58) Field of Classification Search
CPC . G10L 15/06; G10L 15/07; G10L 2015/0635; G10L 17/005; G10L 17/04;
(Continued)

(56) References Cited

U.S. PATENT DOCUMENTS 6,249,760 B1 * 6/2001 Bossemeyer, Jr. ...... G10L 17/04
704/225
7,162,641 B1 * 1/2007 Chaudhari .............. G10L 17/06
704/246

(Continued)

FOREIGN PATENT DOCUMENTS

CN    101685635 A    3/2010
CN    102254559 A    11/2011
(Continued)

OTHER PUBLICATIONS

International Search Report of the ISA for PCT/CN2015/090505, Haidian District, Beijing, dated Dec. 29, 2015.

*Primary Examiner* — Martin Lerner
(74) *Attorney, Agent, or Firm* — Oblon, McClelland, Maier & Neustadt, L.L.P.

(57) ABSTRACT

Embodiments of the present invention provide a voiceprint verification method and device. The voiceprint verification method comprises receiving verification voice data relating to a verification phrase; generating a verification voiceprint on the basis of said verification voice data; determining whether a similarity value between the verification voiceprint and a reference voiceprint conforms to a preset similarity value; and, if the similarity value between the verifi-
(Continued)

cation voiceprint and a reference voiceprint conforms to a preset similarity value, then determining there is a match between the verification voiceprint and the reference voiceprint.

20 Claims, 10 Drawing Sheets

(51) Int. Cl.
| | | |
|---|---|---|
| *G10L 17/08* | (2013.01) | |
| *G10L 15/30* | (2013.01) | |
| *G10L 17/02* | (2013.01) | |
| *G10L 17/22* | (2013.01) | |
| *H04L 29/06* | (2006.01) | |
| *H04L 9/32* | (2006.01) | |

(52) U.S. Cl.
CPC ........ H04L 9/3231 (2013.01); H04L 63/0861 (2013.01)

(58) Field of Classification Search
CPC ......... G10L 17/08; G10L 17/22; G10L 17/02; G10L 17/06; G10L 25/03; G10L 25/27
USPC ................ 704/233, 236, 243, 244, 246, 273
See application file for complete search history.

(56) References Cited

U.S. PATENT DOCUMENTS

| | | | | |
|---|---|---|---|---|
| 7,386,105 | B2* | 6/2008 | Wasserblat | G10L 17/26 |
| | | | | 704/273 |
| 8,438,385 | B2* | 5/2013 | Song | H04L 9/3263 |
| | | | | 713/156 |
| 8,694,315 | B1 | 4/2014 | Sheets et al. | |
| 9,237,232 | B1* | 1/2016 | Williams | G10L 17/04 |
| 9,875,743 | B2* | 1/2018 | Gorodetski | G10L 17/04 |
| 2003/0182119 | A1* | 9/2003 | Junqua | G10L 15/24 |
| | | | | 704/246 |
| 2004/0107099 | A1* | 6/2004 | Charlet | G10L 17/12 |
| | | | | 704/234 |
| 2004/0186724 | A1* | 9/2004 | Morin | G10L 17/06 |
| | | | | 704/273 |
| 2005/0125226 | A1* | 6/2005 | Magee | G10L 17/04 |
| | | | | 704/246 |
| 2010/0228656 | A1 | 9/2010 | Wasserblat et al. | |
| 2011/0276331 | A1* | 11/2011 | Yamazaki | G10L 17/04 |
| | | | | 704/246 |
| 2012/0243694 | A1* | 9/2012 | Bradley | G10L 17/02 |
| | | | | 381/56 |
| 2013/0006991 | A1* | 1/2013 | Nagano | G10L 17/26 |
| | | | | 707/737 |
| 2013/0080169 | A1* | 3/2013 | Harada | G10L 25/63 |
| | | | | 704/249 |
| 2014/0081640 | A1* | 3/2014 | Farrell | G10L 17/24 |
| | | | | 704/249 |
| 2014/0136194 | A1* | 5/2014 | Warford | G10L 17/02 |
| | | | | 704/246 |
| 2015/0081295 | A1* | 3/2015 | Yun | G10L 17/005 |
| | | | | 704/236 |
| 2015/0112680 | A1 | 4/2015 | Lu | |
| 2018/0211670 | A1* | 7/2018 | Gorodetski | G10L 17/04 |

FOREIGN PATENT DOCUMENTS

| | | |
|---|---|---|
| CN | 102404287 A | 4/2012 |
| CN | 102457845 A | 5/2012 |
| CN | 102510426 A | 6/2012 |
| CN | 102708867 A | 10/2012 |
| CN | 102760434 A | 10/2012 |
| CN | 102916815 A | 2/2013 |
| CN | 103037368 A | 4/2013 |
| CN | 103220286 A | 7/2013 |
| CN | 103730114 A | 4/2014 |
| CN | 104168270 A | 11/2014 |
| CN | 104184587 A | 12/2014 |
| CN | 104219050 A | 12/2014 |
| KR | 20020092047 A | 12/2002 |
| KR | 20130113785 A | 10/2013 |

* cited by examiner (a)              (b)

US 10,276,168 B2

VOICEPRINT VERIFICATION METHOD AND DEVICE

CROSS REFERENCE TO RELATED APPLICATION

The present application is a continuation of International Application No. PCT/CN2015/090505, filed on Sep. 24, 2015, which claims the priorities to Chinese Patent Application No. 201410373815.4, titled "METHOD FOR IDENTITY AUTHENTICATION, SERVER, CLIENT AND SYSTEM", filed on Jul. 31, 2014 with the State Intellectual Property Office of the People's Republic of China, Chinese Patent Application No. 201410389788.X, titled "METHOD FOR GENERATING VOICEPRINT, SERVER, CLIENT AND SYSTEM", filed on Aug. 8, 2014 with the State Intellectual Property Office of the People's Republic of China, and Chinese Patent Application No. 201410388869.8, titled "METHOD FOR VOICEPRINT VERIFICATION, SERVER, CLIENT AND SYSTEM", filed on Aug. 8, 2014 with the State Intellectual Property Office of the People's Republic of China, all of which are incorporated herein by reference.

TECHNICAL FIELD

The present disclosure relates to the field of computer technology, and in particular to a method and an apparatus for voiceprint verification.

BACKGROUND

With the rapid development of computer technology, there are more and more clients related to user information that are installed on the terminal side, such as clients of various social application software and clients of various bank application software, to facilitate user operation. Since the various clients may contain a lot of data related to user information or user property, identity authentication is required for the user operating the various clients when the clients are running on a terminal. In a process of performing the identity authentication based on a related technology, a fingerprint recognition method or a face recognition method is usually used. Fingerprint information is taken as physical sign information for the fingerprint recognition, and face image information is taken as physical sign information for the face recognition.

The identity authentication using the fingerprint recognition or face recognition requires a terminal of the client to have a device capable of performing fingerprint recognition or face recognition, which has a high requirement on configuration of the terminal. In addition, the face recognition has a high requirement on the environment. In a case of a poor lighting or a poor performance of a camera, identity authentication may be impossible or the operation for the identity authentication based on the face recognition may be failed, which results in a low reliability and a low efficiency of the identity authentication.

SUMMARY

In order to solve the conventional problem, a method and apparatus for voiceprint verification are provided according to embodiments of the present disclosure.

A method for voiceprint verification is provided according to an embodiment of the present disclosure, which includes: receiving verification voice data associated with a verification corpus; generating a verification voiceprint based on the verification voice data; determining whether a score of a similarity between the verification voiceprint and a reference voiceprint reaches a preset similarity score; and determining that the verification voiceprint is matched with the reference voiceprint in a case that the score of the similarity between the verification voiceprint and the reference voiceprint reaches the preset similarity score.

An apparatus for voiceprint verification is provided according to an embodiment of the present disclosure, which includes: a memory and one or more processors, where program instructions are stored on the memory, and the program instructions, when executed by the processors, cause the apparatus to perform the method for voiceprint verification described above.

BRIEF DESCRIPTION OF THE DRAWINGS

In order to more clearly illustrate technical solutions in embodiments of the present disclosure, drawings used in the description of the embodiments are introduced briefly hereinafter. Apparently, the drawings described hereinafter only illustrate some embodiments of the present disclosure, and other drawings can be obtained by those skilled in the art based on these drawings without any creative efforts.

DETAILED DESCRIPTION OF THE EMBODIMENTS

To make the object, technical solutions and advantages of the present disclosure clearer, embodiments of the present disclosure are described in detail hereinafter, in conjunction with the drawings.

Figure 1:
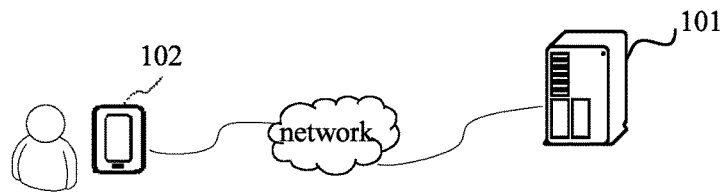
FIG. 1 is a schematic diagram of a system for voiceprint verification according to an embodiment of the present disclosure.

FIG. 1 is a schematic diagram of a system for performing verification (such as identity authentication) by means of voiceprint according to an embodiment of the present disclosure. As shown in FIG. 1, the system includes a server 101 and a terminal 102. The server 101 and the terminal 102 are connected with each other via a wireless network or a wired network.

Figure 2:
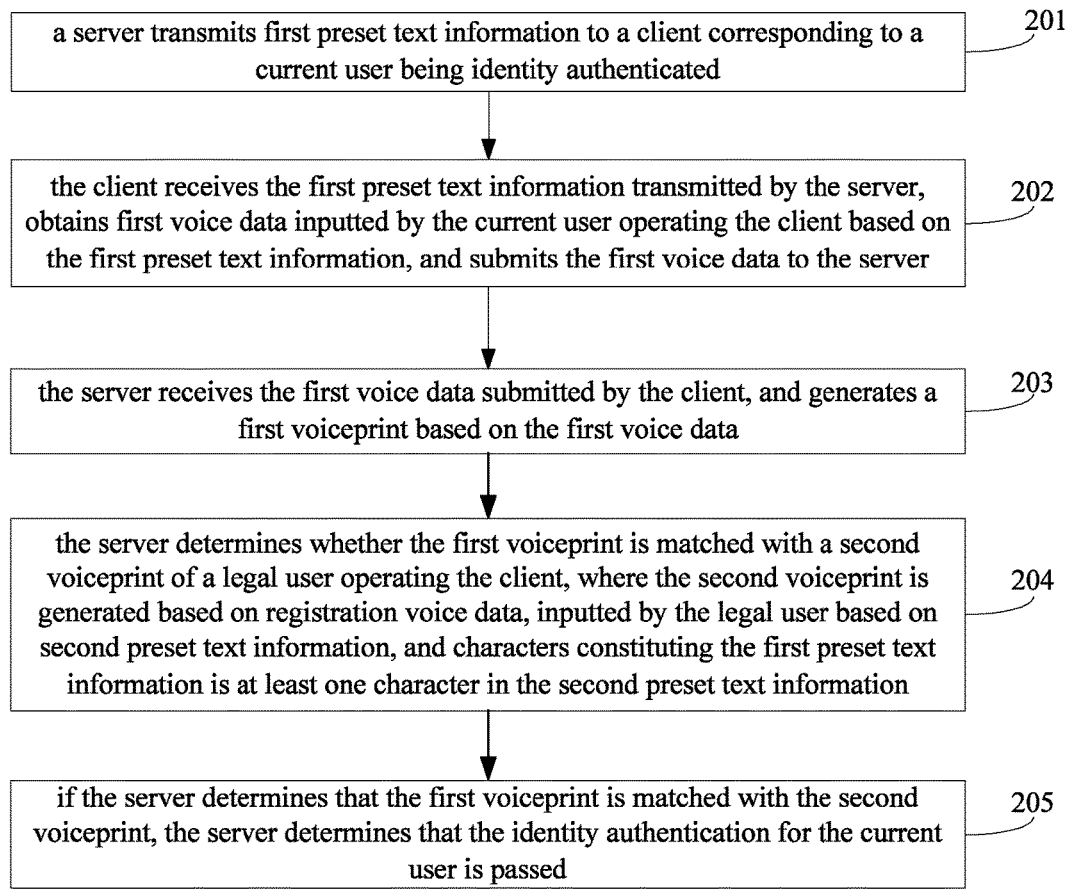
FIG. 2 is a flow chart of a method for voiceprint verification according to an embodiment of the present disclosure.

FIG. 2 is a flow chart of a method for voiceprint verification according to an embodiment of the present disclosure. The voiceprint verification may be applied to identity authentication, for example. Referring to FIG. 2, the method according to the embodiment of the present disclosure includes steps 201 to 205.

In step 201, a server transmits a verification corpus to a client corresponding to a current user performing identity authentication.

The method for identity authentication according to the embodiment of the present disclosure may be applied to any scenario requiring identity authentication before operations, such as a login scenario, a payment scenario and an access control system with identity authentication. In the embodiment of the present disclosure, the client may be, for example, an application on the terminal 102. The client may be various clients requiring identity authentication before operations, such as a social application client, a bank account client, a payment client and an access control verification client.

In the method for identity authentication according to the embodiment of the present disclosure, the server transmits a verification corpus (such as preset text information) to a client corresponding to the current user to be identity-authenticated, to trigger identity authentication to the current user operating the client. The preset text information herein is also referred to as first preset text information, for differentiating from second preset text information which will be described hereinafter.

Figure 3:
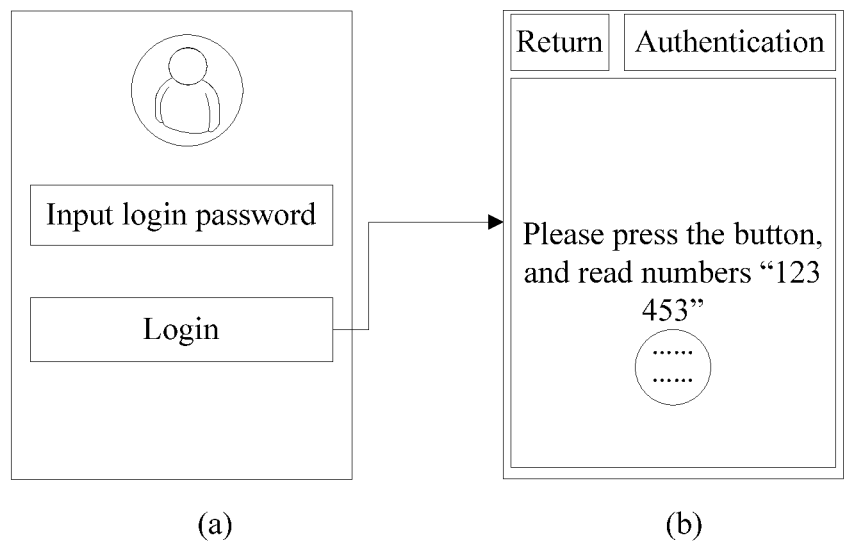
FIG. 3(a) is a flow chart of a login interface of a client according to an embodiment of the present disclosure.
FIG. 3(b) is a schematic diagram of a client interface when obtaining voice data inputted by a current user according to an embodiment of the present disclosure.

For example, the method according to the embodiment of the present disclosure is applied to identity authentication to a current user logging to a client, in this case, the server transmits first preset text information to the client to be logged in to that corresponds to the current user to be identity-authenticated, after the client enters a login interface. FIG. 3(a) is a schematic diagram of a login interface of a client.

As another example, the method according to the embodiment of the present disclosure is applied to identity authentication to a current user performing a payment operation on a payment client, in this case, the server transmits first preset text information to the client corresponding to the current user to be identity-authenticated, after the client enters a payment interface.

Content of the first preset text information is not limited in the embodiment of the present disclosure. In an implementation, the first preset text information includes but is not limited to number, verse, letter, Chinese character.

In step 202, the client receives the verification corpus transmitted by the server (such as first preset text information), obtains first voice data (i.e., verification voice data) inputted by the current user operating the client based on the verification corpus, and submits the first voice data to the server.

Voices of different users have different features. After a voiceprint is generated based on voice data of a user, it can be determined, based on the voiceprint, that whether a speaker of certain voice data is the user corresponding to the voiceprint. Therefore, the method according to the embodiment of the present disclosure supports identity authentication to a current user operating a client based on a first voiceprint (i.e., a verification voiceprint) of the current user operating the client and a second voiceprint (i.e., a reference voiceprint) of a legal user operating the client. In order to enable the server to obtain the first voiceprint of the current user, the client receives the first preset text information transmitted by the server, and obtains the first voice data inputted by the current user based on the first preset text information. In addition, in order to enable the server to generate a first voiceprint of the current user based on the first voice data and then further perform identity authentication on the current user based on the first voiceprint, the client submits the first voice data to the server.

Reference is made to FIG. 3(b) which is a schematic diagram of a client interface when the client obtains voice data inputted by a current user based on first preset text information. In FIG. 3(b), the first preset text information is "123 453".

In step 203, the server receives the first voice data submitted by the client, and generates a first voiceprint (i.e., a verification voiceprint) based on the first voice data.

The server may generate the first voiceprint based on the first voice data by using a voiceprint generation algorithm. The voiceprint generation algorithm may include, for example, SCHMM (Semi-Continuous Hidden Markov Model) and GMM-UBM (Gaussian Mixture Model-Universal Background Model). The manner that the server generates the first voiceprint based on the first voice data by using the voiceprint generation algorithm is not limited in the embodiment of the present disclosure. In an implementation, a typical characteristic of the first voice data is extracted. For example, characteristics such as wavelength, frequency, intensity and rhythm of a voice can reflect the feature of the voice of a user. Therefore, in generating the voiceprint based on the first voice data, characteristics such as wavelength, frequency, intensity and rhythm of the first voice data may be extracted, and characteristic values of the characteristics such as wavelength, frequency, intensity and rhythm of the first voice data are determined, to be taken as the first voiceprint.

In step 204, the server determines whether the first voiceprint is matched with a second voiceprint (i.e., a reference voiceprint) of a legal user operating the client. The second voiceprint may be a registration voiceprint, or may be an evolution voiceprint. The registration voiceprint may be generated based on registration voice data, which is inputted by the legal user based on a registration corpus (such as second preset text information). According to the embodiment of the present disclosure, characters constituting the first preset text information may be at least one character in the second preset text information.

In order to determine whether the current user operating the client is the legal user operating the client, the server determines whether the first voiceprint is matched with the second voiceprint of the legal user operating the client. The second voiceprint of the legal user operating the client may include a lot of content, for example, characteristic values of characteristics such as wavelength, frequency, intensity and rhythm of a voice of the legal user.

The manner that the server determines whether the first voiceprint is matched with the second voiceprint of the legal user operating the client includes but is not limited to: extracting, in the first voiceprint, a characteristic value of a characteristic consistent with the characteristic in the second voiceprint and comparing the extracted characteristic value with a characteristic value of the characteristic in content of the second voiceprint. For example, if the second voiceprint includes wavelength and frequency, then wavelength and frequency of the first voiceprint may be extracted, characteristic values of the wavelength and frequency of the first voiceprint are determined, and the characteristic values of the wavelength and frequency of the first voiceprint are compared with characteristic values of the wavelength and frequency of the second voiceprint respectively, to determine whether the first voiceprint is matched with the second voiceprint.

In step 205, if the server determines that the first voiceprint is matched with the second voiceprint, it is determined that the identity authentication for the current user is passed.

Specifically, if the server determines that the first voiceprint is matched with the second voiceprint, it is determined that the current user is a legal user. Hence, it is determined that the identity authentication for the current user is passed.

Optionally, if the server determines that the first voiceprint is not matched with the second voiceprint, the server may determine that the current user is not a legal user. Hence, the server may determine that the identity authentication for the current user is not passed. Furthermore, if the identity authentication for the current user is not passed, the server may forbid the current user to operate the client, or requires the current user to be authenticated again.

According to an embodiment of the present disclosure, before the steps 201 to 205 of identity authentication for the current user, it may be determined whether a terminal where the client is located is a pre-certified safety device. If it is determined that the terminal where the client is located is a pre-certified safety device, the identity authenticated for the current user is directly performed by using the steps 201 to 205. If it is determined that the terminal where the client is located is not a pre-certified safety device, preliminary identity authentication for the current user may be firstly performed by using three steps as follows.

In step one, the client obtains current operation verification information inputted by the current user operating the client, and submits the current operation verification information to the server.

The current operation verification information may be, for example, a verification code issued by the server, or a password for operating the client. For example, when a current user logging in to a client is being identity-authenticated, the current operation verification information may be a text password for logging in to the client.

In step two, the server receives the current operation verification information submitted by the client, and determines whether the current operation verification information is correct.

In order to preliminarily determine whether the user operating the client is the legal user of the client, it needs to determine whether the current operation verification information is correct. The manner of determining whether the current operation verification information is correct includes but is not limited to comparing the current operation verification information with pre-stored operation verification information about the client. For example, in a scenario of verifying a login operation of a current user, in a case that the current operation verification information is a text password for logging in to a client, the text password for logging in to the client is compared with a pre-stored text password which is set when registering the client, to determine whether the current operation verification information is correct.

In step three, in a case that the server determines that the current operation verification information is correct, the steps 201 to 205 may be performed to continue identity authentication, to further authenticate the identity of the current user.

Optionally, if the server determines that the current operation verification information is not correct, the identity authentication to the current user may be stopped directly. In this case, in order to ensure security of operation of the client, the server may forbid running the client on the terminal.

In the method according to the embodiment of the present disclosure, the server matches the first voiceprint of the current user operating the client with the second voiceprint of the legal user operating the client to implement identity authentication. In this way, the requirement on configuration of the terminal where the client is located is low and thus the application scope is wide. In addition, the method is not affected by an environment where the client is located, and thus efficiency and reliability of the identity authentication is increased.

Figure 4:
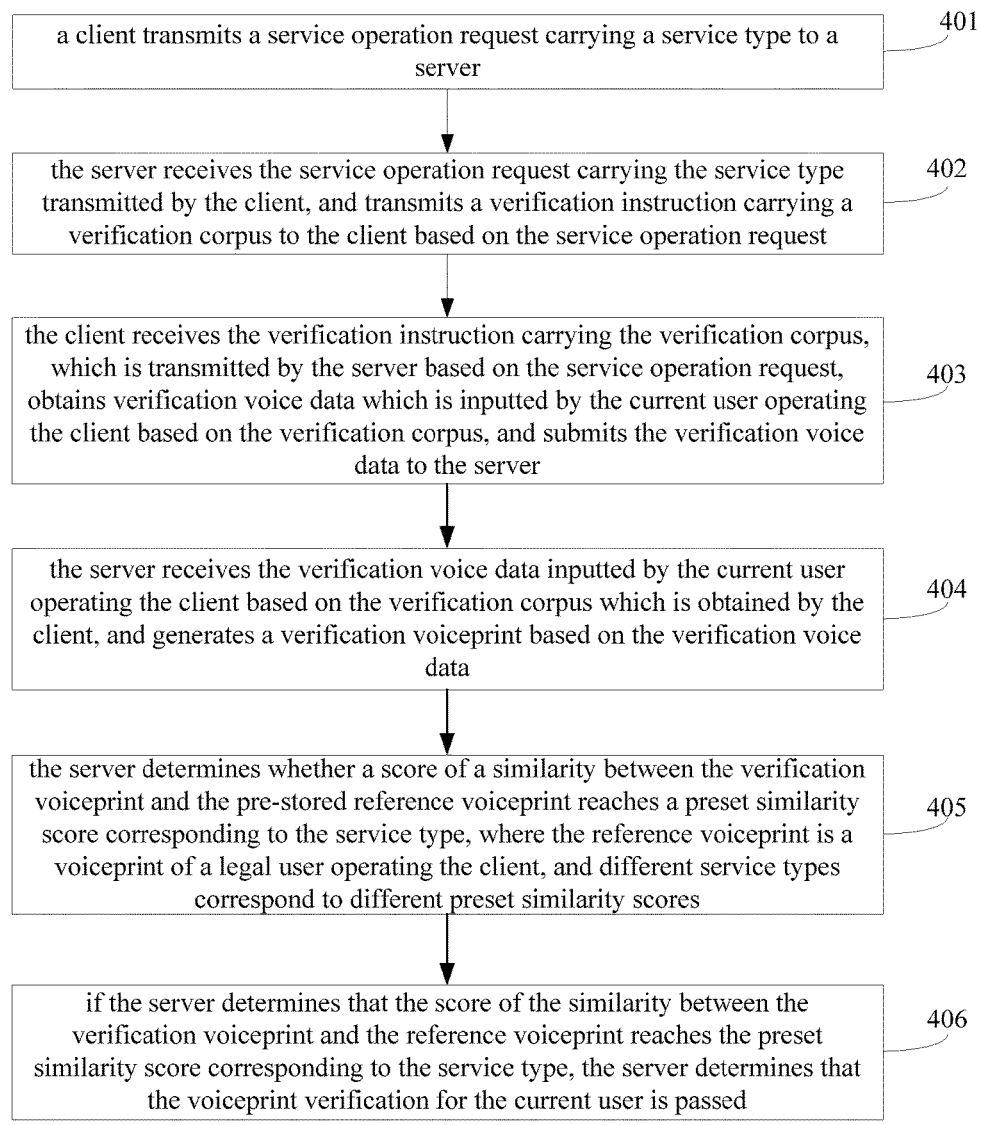
FIG. 4 is a flow chart of a method for voiceprint verification according to an embodiment of the present disclosure.

FIG. 4 is a flow chart of a method for voiceprint verification according to an embodiment of the present disclosure. Referring to FIG. 4, the method according to the embodiment of the present disclosure includes steps 401 to 406.

In step 401, a client transmits a service operation request carrying a service type to a server.

If a current user wants to operate a service of a certain service type on the client, the current user needs to transmit a service operation request carrying the service type to the server via the client. The client may be triggered to transmit the service operation request carrying the service type to the server, after obtaining an operation instruction of the current user. In an implementation, the manner that the client obtains the operation instruction of the current user includes but is not limited to detecting whether an operation option or an operation button is selected. There are multiple ways to detect whether the operation option or the operation button is selected. For example, whether the operation option or operation button is clicked or double clicked, or whether a touch operation on the operation option or operation button lasts for a preset time, may be detected.

The service type is not limited in the embodiment of the present disclosure. In an implementation, the service type may be determined in conjunction with service types supported by the client. For example, the service type may be a login service, a payment service or a community access control service.

For example, if the service type is a login service, the current user needs to transmit a login operation request carrying the login service to the server via a corresponding client. The process that the client transmits the login operation request carrying the login service to the server may be triggered after detecting that a login option corresponding to the client is selected. The detecting whether the login option is selected includes but is not limited to detecting whether the login option is clicked or double clicked, or whether a touch operation on the login option lasts for a preset time.

For example, if the service type is a community access control service, identity authentication to the current user before the current user enters the community may be implemented by voiceprint verification. In order to trigger a process of voiceprint verification, the current user may enter an access control verification page via a client, to trigger the client to transmit a service operation request carrying the community access control service to the server. The manner that the current user enters the access control verification page includes but is not limited to establishing a connection with an access control management system via the client. The manner that the current user establishes a connection with the access control management system via the client includes but is not limited to following a public number of the access control management system.

In step 402, the server receives the service operation request carrying the service type transmitted by the client, and transmits a verification instruction carrying a verification corpus to the client based on the service operation request.

In order to trigger identity authenticating to the current user by means of voiceprint verification, the server transmits a verification instruction carrying a verification corpus to the client based on the service operation request, to enable the current user to input voice data based on the verification corpus.

It should be noted that, the server needs to obtain the verification corpus before transmitting the verification instruction carrying the verification corpus to the client based on the service operation request. Content of the obtained verification corpus is not limited in the embodiment of the present disclosure. In an implementation, the content of the verification corpus is related to the corpus used in forming a reference voiceprint. The verification corpus is not described herein and will be described in details in subsequent description of the reference voiceprint.

Optionally, the process of voiceprint verification is usually initiated by the server. However, voiceprint verification may also be initiated artificially. In order to ensure that the process of voiceprint verification is initiated by a client and avoid the process of voiceprint verification initiated artificially, the server may generate an electronic note when initiating a process of voiceprint verification, and carry the electronic note in each interaction with the client, to identify basic information about the process of voiceprint verification and ensure security of the process of voiceprint verification. In order to generate the electronic note, the server obtains user information about the current user (the user information herein is referred to as second user information, for differentiating from first user information described hereinafter) based on the service operation request, and generate the electronic note based on the second user information, before transmitting the verification instruction carrying the verification corpus to the client based on the service operation request.

For content of the second user information, in an implementation, in order to identify the basic information about the process of voiceprint verification, the second user information at least includes but is not limited to a service type, a verification time, account information about the current user and terminal information about the current user. In an implementation, the manner of generating the electronic note based on the second user information includes but is not limited to establishing a mapping between an electronic note identifier and second user information.

The manner of obtaining the second user information includes but is not limited to receiving the second user information submitted by the client.

Therefore, if the server generates the electronic note in the process of voiceprint verification, for the process of transmitting the verification instruction carrying the verification corpus to the client based on the service operation request, the server may transmit a verification instruction carrying the verification corpus and the generated electronic note to the client based on the service operation request.

In step 403, the client receives the verification instruction carrying the verification corpus, which is transmitted by the server based on the service operation request, obtains verification voice data which is inputted by the current user operating the client based on the verification corpus, and submits the verification voice data to the server.

Usually, the server generates a voiceprint of a user based on voice data of the user. Therefore, the client obtains the verification voice data which is inputted based on the verification corpus by the current user operating the client, and submits the verification voice data to the server.

The manner that the client obtains the verification voice data inputted based on the verification corpus by the current user operating the client is not limited in the embodiment of the present disclosure. In an implementation, the client records voice data inputted by the current user when the current user inputs the verification voice data based on the verification corpus. Specifically, in a process of recording the verification voice data, a start instruction of a microphone or a voice tube may be obtained firstly, and voice data inputted by the current user based on the verification corpus is recorded according to the start instruction of the microphone or voice tube. There are many ways to obtain the start instruction of the microphone or voice tube. In an implementation, the way includes but is not limited to detecting a long press on the microphone or voice tube.

Optionally, after the client receives the verification instruction carrying the verification corpus transmitted by the serve based on the service operation request, the client may display the verification corpus carried in the verification instruction. In this way, the current user can read the verification corpus based on the displayed verification corpus for inputting the verification voice data, which avoids a situation that the inputted verification voice data does not meet a condition of verification voice data due to the user forgetting the content of the verification corpus. Therefore, efficiency of obtaining the verification voice data of the current user and thus efficiency of voiceprint verification are improved while a good user experience is provided.

There are many ways to submit the verification voice data to the server. For example, the client may provide a submit option on the verification voice data record page while recording the verification voice data of the current user, and determine whether to submit the verification voice data to the server by detecting whether the submit option is selected. Upon detection by the client that the submit option is selected, submitting the verification voice data to the server is triggered.

In addition, in view that the voice data is usually large, for submitting the verification voice data to the server, the client may divide the verification voice data into several parts, and submit the pieces of the divided voice date respectively until all verification voice data is submitted. In the process of dividing the verification voice data, the verification voice data may be divided into pieces of voice data with the same size, or may be divided into pieces of voice data with different sizes. The sizes of the pieces of the divided voice data are not limited in the embodiment of the present disclosure.

For example, the verification voice data may be divided into three parts with the same size, to obtain verification voice data 1, verification voice data 2 and verification voice data 3. Then, for submitting the verification voice data to the server, the client submits the verification voice data 1, the verification voice data 2 and the verification voice data 3 respectively.

Optionally, if the electronic note is also transmitted when the server transmits the verification instruction carrying the verification corpus to the client, the client may submit second user information to the server, to enable the server to obtain the second user information. The manner that the client submits the second user information to the server is not limited in the embodiment of the present disclosure. In addition, after the electronic note is generated, the electronic note needs to be carried in each interaction between the server and the client. Therefore, when the client receives the verification instruction carrying the verification corpus transmitted by the server, the client also receives the electronic note generated by the server and carried in the verification instruction. In this case, the client submits the electronic note generated by the server to the server while submitting the verification voice data to the server.

In step 404, the server receives the verification voice data inputted by the current user operating the client based on the verification corpus, which is obtained by the client, and generates a verification voiceprint based on the verification voice data.

In order to obtain the voiceprint of the current user, the server receives the verification voice data inputted by the current user operating the client based on the verification corpus, which is obtained by the client, and generates a verification voiceprint based on the verification voice data. The manner that the server receives the verification voice data inputted by the current user operating the client based on the verification corpus, which is obtained by the client, is not limited in the embodiment of the present disclosure. In addition, the server may generate the verification voiceprint based on the verification voice data by using a voiceprint generation algorithm. The manner that the server generates the verification voiceprint based on the verification voice data by using the voiceprint generation algorithm is not limited in the embodiment of the present disclosure. In an implementation, a typical characteristic of the verification voice data may be extracted. Specifically, characteristics such as wavelength, frequency, intensity and rhythm of a voice can reflect the feature of the voice of a user. Therefore, in generating the verification voiceprint based on the verification voice data, characteristics such as wavelength, frequency, intensity and rhythm of the verification voice data may be extracted, and characteristic values of the characteristics such as wavelength, frequency, intensity and rhythm of the verification voice data are determined, to be taken as the verification voiceprint.

In addition, if the client divides the verification voice data into several pieces of voice data in the process of submitting the verification voice data, then in the process of generating the verification voiceprint, the server needs to splice all the pieces of the voice data constituting the verification voice data together and then generates the verification voiceprint based on all the pieces of voice data constituting the verification voice data that have been spliced.

Optionally, if the client also submits the electronic note generated by the server while submitting the verification voice data, the server needs to determine whether the electronic note submitted by the client is consistent with the electronic note generated by the server before generating the verification voiceprint based on the verification voice data, to ensure security of the voiceprint verification process. If the electronic note submitted by the client is consistent with the electronic note generated by the server, the step of generating the verification voiceprint based on the verification voice data is performed. If the server determines that the electronic note submitted by the client is not consistent with the electronic note generated by the server, it is determined that the current user is an illegal user and the voiceprint verification is terminated, thereby forbidding the current user to operate the server corresponding to the service type carried in the service operation request on the client.

The manner that the server determines whether the electronic note submitted by the client is consistent with the electronic note generated by the server includes but is not limited to determining whether there is a change in the electronic note submitted by the client compared with the electronic note generated by the server. If the server determines that there is no change in the electronic note submitted by the client compared with the electronic note generated by the server, it is determined that the electronic note submitted by the client is consistent with the electronic note generated by the server.

There are many ways to terminate the voiceprint verification. In an implementation, the way includes but is not limited to forcibly exiting a page corresponding to the service type which has been entered by the client, or transmitting a prompt message to prompt the current user that the operation is failed. For example, if the voiceprint verification is used to verify a login service of the current user, the current user may be forbidden to log in to the client.

In order to further determine whether the current user is a legal user, identity authentication to the current user may be continued. The server may perform identity authentication on the current user in other ways. In a case that the server performs identity authentication on the current user in other ways, the server may perform identity authentication on the current user by popping a verification interface and obtaining information inputted into the verification interface by the current user. The specific implementation process of performing identity authentication on the current user based on the information inputted into the verification interface by the current user is not limited in the embodiment of the present disclosure.

Optionally, in order to ensure that the process of voiceprint verification is valid in a certain time period, the server may set a valid time for the generated electronic note. Voiceprint verification completed in the valid time of the generated electronic note is determined to be valid. If the process of voiceprint verification exceeds the valid time of the generated electronic note, the process of voiceprint verification is determined to be invalid. Therefore, after receiving the verification voice data and the electronic note submitted by the client, the server needs to determine whether the electronic note submitted by the client is within the preset valid time of the generated electronic note. If it is determined that the electronic note submitted by the client is within the preset valid time of the generated electronic note, the server determines whether the electronic note submitted by the client is consistent with the generated electronic note. If it is determined that the electronic note submitted by the client is not within the preset valid time of the generated electronic note, the server determines that the current user is illegal and terminates the voiceprint verification.

The manner of determining the preset valid time is not limited in the embodiment of the present disclosure. In an implementation, a basic time for completing voiceprint verification may be obtained by experience and statistics, and the basic time is determined as the preset valid time. Alternatively, the preset valid time may also be determined in other manners. The length of the preset valid time is not limited in the embodiment of the present disclosure.

There are many ways to terminate the voiceprint verification. In an implementation, the principle for terminating the voiceprint verification is the same as that of terminating the voiceprint verification if the server determines that the electronic note submitted by the client is not consistent with the electronic note generated by the server described above. Reference can be made to the above content, which is not described herein.

In step 405, the server determines whether a score of a similarity between the verification voiceprint and the pre-stored reference voiceprint reaches a preset similarity score corresponding to the service type. The reference voiceprint is a voiceprint of a legal user operating the client. Different service types correspond to different preset similarity scores.

In order to determine whether the current user can operate the service corresponding to the service type on the client, the server needs to determine whether the score of the similarity between the verification voiceprint and the pre-stored reference voiceprint of the legal user operating the client reaches the preset similarity score corresponding to the service type.

Before determining whether the score of the similarity between the verification voiceprint and the pre-stored reference voiceprint reaches the preset similarity score corresponding to the service type, the preset similarity score corresponding to the service type carried in the service operation request needs to be determined firstly. The manner of determining the preset similarity score corresponding to the service type carried in the service operation request includes but is not limited to: obtaining a mapping between each service type supported by the client and the corresponding preset similarity score, and determining the preset similarity score corresponding to the service type carried in the service operation request based on the mapping.

The manner of obtaining the mapping between each service type supported by the client and the corresponding preset similarity score is not limited in the embodiment of the present disclosure. In an implementation, the mapping may be obtained locally or obtained from other nodes. The manner of determining the preset similarity score corresponding to the service type carried in the service operation request based on the mapping includes but is not limited to comparing the service type carried in the service operation request with all the service types in the mapping one by one, and determining a preset similarity score corresponding to a service type, which is the same as the service type carried in the service operation request, in the mapping, as the preset similarity score corresponding to the service type carried in the service operation request.

Reference is made to Table 1, which is a schematic table of a mapping between each service type supported by a client and the preset similarity score corresponding to each service type.

TABLE 1

| service type | preset similarity score |
|---|---|
| login service | 80 |
| ... | ... |
| payment service | 98 |

For example, as shown in Table 1, if the service type carried in the service operation request is a login service, then in the process of determining a preset similarity score corresponding to the login service, the login service may be compared with all the service types included in Table 1 one by one, and it is determined that the preset similarity score corresponding to the login service is 80.

The service types and the preset similarity scores corresponding to the service types listed in Table 1 are only used for illustration, and are not limitation to the embodiment of the present disclosure. In addition, in the embodiment of the present disclosure, the reference voiceprint of the legal user may be evolved in a real-time manner. Hence, the preset similarity score corresponding to the service type may also be updated in a real-time manner. Therefore, in the process of obtaining the mapping between each service type supported by the client and the corresponding preset similarity score, the latest mapping between each service type supported by the client and the corresponding preset similarity score is required to be obtained.

In addition, in order to determine whether the score of the similarity between the verification voiceprint and the pre-stored reference voiceprint reaches the preset similarity score corresponding to the service type, the score of the similarity between the verification voiceprint and the reference voiceprint needs to be determined. The manner of determining the score of the similarity between the verification voiceprint and the reference voiceprint includes but is not limited to: obtaining the reference voiceprint and calculating the score of the similarity between the verification voiceprint and the reference voiceprint.

The manner of obtaining the reference voiceprint is not limited in the embodiment of the present disclosure. It should be noted that, the reference voiceprint may be a registration voiceprint obtained when the legal user registers the voiceprint, or may be an evolution voiceprint obtained by evolving the registration voiceprint based on verification voice data stored after voiceprint verification performed with the registration voiceprint is passed. Therefore, whether the reference voiceprint is the registration voiceprint or the evolution voiceprint needs to be determined. Content of the registration voiceprint and the evolution voiceprint will be described in details hereinafter.

There are many ways to calculate the score of the similarity between the verification voiceprint and the reference voiceprint. In an implementation, the score may be calculated in conjunction with dimensions included in characteristics of a voiceprint, a characteristic value of each dimension and a weight of the each dimension. Specifically, the way includes but not limited to: determining a characteristic value of each dimension of the verification voiceprint and a characteristic value of each dimension of the reference voiceprint, and determining a weight of the each dimension; and calculating the score of the similarity between the verification voiceprint and the reference voiceprint based on the characteristic value of the each dimension of the verification voiceprint, the characteristic value of the each dimension of the reference voiceprint, and the weight of the each dimension.

For example, dimensions of a voiceprint include wavelength, frequency and intensity. In this case, in the process of calculating the score of the similarity between the verification voiceprint and the reference voiceprint, weights of wavelength, frequency and intensity are 0.3, 0.4 and 0.3 respectively, characteristic values of wavelength, frequency and intensity of the verification voiceprint are 73, 75 and 85 respectively, and characteristic values of wavelength, frequency and intensity of the reference voiceprint are 75, 80 and 90 respectively. Therefore, the score of the similarity between the verification voiceprint and the reference voiceprint is: 100−(0.3*(75−73)+0.4*(80−75)+0.3*(90−85)) =95.9. That is, the more similar the characteristic values of the verification voiceprint and the reference voiceprint is, the more higher the score of the similarity between the verification voiceprint and the reference voiceprint is.

The manner that the server determines whether the score of the similarity between the verification voiceprint and the pre-stored reference voiceprint reaches the preset similarity score corresponding to the service type includes but is not limited to comparing the score of the similarity between the calculated verification voiceprint and the reference voiceprint with the obtained preset similarity score corresponding to the service type carried in the service operation request. For example, if the score of the similarity between the calculated verification voiceprint and the reference voiceprint is 80, and the obtained preset similarity score corresponding to the service type carried in the service operation request is 75, it is determined that the score of the similarity between the verification voiceprint and the reference voiceprint reaches the preset similarity score corresponding to the service type.

Different service types have different correlations with user data or user property of a user. Some service types directly relate to security of user data and user property, and some service types have a small influence on security of user data and user property. Therefore, in the embodiment of the present disclosure, different voiceprint verification levels are set for different service types, and the different service types are set to correspond to different preset similarity scores. The content is not described herein and will be described in detail hereinafter.

Optionally, as described above, in the embodiment of the present disclosure, the reference voiceprint may be a registration voiceprint, or may be an evolution voiceprint. In a case that the reference voiceprint is a registration voiceprint, the registration voiceprint needs to be generated before obtaining the reference voiceprint.

In step 406, if the server determines that the score of the similarity between the verification voiceprint and the reference voiceprint reaches the preset similarity score corresponding to the service type, the server determines that the voiceprint verification for the current user is passed.

In the embodiment of the present disclosure, different voiceprint verification levels are set for different service types supported by the client, and the different voiceprint verification levels are set to correspond to different preset similarity scores. For example, five voiceprint verification levels, such as a low level, a basic level, a medium level, a high level and a very high level, are set for different service types supported by the client, and preset similarity scores corresponding to the low level, the basic level, the medium level, the high level and the very high level are set to be 50-60, 60-70, 70-80, 80-90 and 90-100 respectively. In this case, if the score of the similarity between the verification voiceprint and the reference voiceprint falls within a preset similarity score range corresponding to a level, it is determined that the similarity between the verification voiceprint and the reference voiceprint reaches the preset similarity score corresponding to the level, otherwise it is determined that the similarity between the verification voiceprint and the reference voiceprint does not reach a preset similarity score corresponding to any level. In the example, only the voiceprint verification with five levels divided based on different service types and the preset similarity scores corresponding to the levels are described for illustration. The levels and the corresponding preset similarity scores in the example are not limitation to the embodiment of the present disclosure.

Different service types have different correlation degrees with user data or user property. Therefore, after the different voiceprint verification levels are set based on the different service types, a voiceprint verification level corresponding to each service type may be set based on the service types supported by the client. For example, the service types supported by the client include a login service, a payment service, a community access control service and a voiceprint registration service, and the login service includes a login service for a commonly used device and a login service for a new device. Since the payment service directly relates to security of the user property, a voiceprint verification level of the payment service may be set to be a very high level. Since the login service for a commonly used device is a sensitive operation and usually relates to the user data directly, a voiceprint verification level of the login service for the commonly used device may be set to be a high level. In a process of logging to a client on a new device, a password for logging in to the client is usually obtained before the voiceprint verification, and second identity authentication for the current user logging in to the client is performed by means of voiceprint verification, thus a voiceprint verification level of the login service for a new device which is performed after password verification is passed may be set to be a basic level. In addition, in a case that voiceprint verification is performed on a client for the community access control service, and since the community access control service has a low correlation degree with the user data and the user property, a level of the service may be set to be a low level. Preliminary voiceprint verification after voiceprint registration is only to verify whether the registered voiceprint is valid, thus the level of the preliminary voiceprint verification is set to be a medium level.

The voiceprint verification may also be divided into other levels. In an implementation, the division may be determined based on all the service types supported by the client. Content of all the service types supported by the client is not limited in the embodiment of the present disclosure.

Optionally, if the electronic note is generated in the process of voiceprint verification, and the second user information is obtained by the server when generating the electronic note, the server may record the second user information after determining that the voiceprint verification for the current user is passed. The server may also obtain stored third user information which is recorded the last time the voiceprint verification is passed, and determine whether the second user information is consistent with the third user information. If it is determined that the second user information is consistent with the third user information, the server marks the current user as a trusted user.

For example, the stored third user information which is recorded last time the voiceprint verification is passed is that: a user 44525445 passes voiceprint verification of a login service on a terminal X with a terminal ID (Identity) of ack5864dsghgd8984562156412. In this voiceprint verification, it is checked whether the user is 44525445, whether the device is ack5864dsghgd8984562156412 and whether the current operated service is the login service. If all the three conditions are met, it is determined that the user is trusted, and the current user is marked as a trusted user. After the user is marked as a trusted user, identity authentication performed on the user in subsequent login service of the user via the device may adopt a simple verification method.

Optionally, after it is determined that the voiceprint verification for the current user is passed, it may be determined whether a time period for the current user to operate the service corresponding to the service type on the client reaches a preset time period, to limit the time period for the current user to operate the service corresponding to the service type carried in the service operation request on the client. If the time period for the current user to operate the service corresponding to the service type on the client reaches the preset time period, the service corresponding to the service type which is operated by the current user on the client is terminated.

The value of the preset time period is not limited in the embodiment of the present disclosure. In an implementation, different preset time periods may be set based on different service types. For example, since a payment operation is usually implemented quickly, a preset time period corresponding to the payment service may be set to be a short time, such as 2 minutes. As another example, for a login service, since a time interval for a user to log in to a client is long, a preset time period corresponding to the login service may be set to be a long time, such as 30 minutes.

The manner of determining whether the time period for the current user to operate the service corresponding to the service type on the client reaches the preset time period is not limited in the embodiment of the present disclosure. In an implementation, timing is begin when the voiceprint verification is passed, and it is determined whether a difference between a current time and the time when the voiceprint verification is passed reaches the preset time period. If the difference between the current time and the time when the voiceprint verification is passed reaches the preset time period, it is determined that the time period for the current user to operate the service corresponding to the service type on the client reaches the preset time period. If the difference between the current time and the time when the voiceprint verification is passed does not reach the preset time period, it is determined that the time period for the current user to operate the service corresponding to the service type on the client does not reach the preset time period.

Optionally, if the score of the similarity between the verification voiceprint and the reference voiceprint does not reach the preset similarity score corresponding to the service type, the current user is determined to be illegal, and the voiceprint verification is terminated. There are many ways to terminate the voiceprint verification. In an implementation, the way includes but is not limited to exiting the page entered by the client or transmitting a prompt message to prompt the current user that the operation is failed. For example, if the voiceprint verification is used to verify a login service of the current user, the current user may be forbidden to log in to the client. As another example, if the voiceprint verification is used to verify a payment service of the current user, the current user may be forbidden to perform the payment service on the client.

In order to further determine whether the current user is a legal user, identity authentication to the current user may be continued. The server may perform identity authentication on the current user in other ways. In a case that the server performs identity authentication on the current user in other ways, the server may perform identity authentication on the current user by popping a verification interface and obtaining information inputted into the verification interface by the current user. The specific implementation process of performing identity authentication on the current user based on the information inputted into the verification interface by the current user is not limited in the embodiment of the present disclosure.

In the method according to the embodiment of the present disclosure, the server sets different preset similarity scores for different service types. In the process of voiceprint verification, after the client submits the verification voice data of the current user to the server, the server generates the verification voiceprint and detects whether the score of the similarity between the verification voiceprint and the reference voiceprint reaches the preset similarity score corresponding to the service type, to implement the voiceprint verification. In this way, whether the voiceprint verification is successful can be determined for different service types, and the method for voiceprint verification is more flexible.

A method for generating a registration voiceprint is provided according to an embodiment of the present disclosure. The method includes but is not limited to: obtaining registration voice data inputted by a legal user based on registration corpus (such as second preset text information), and generating a registration voiceprint of the legal user based on the obtained registration voice data. The method includes but is not limited to steps one to thirteen.

In step one, a server detects whether a terminal where a client is located is a pre-certified safety device.

Figure 5:
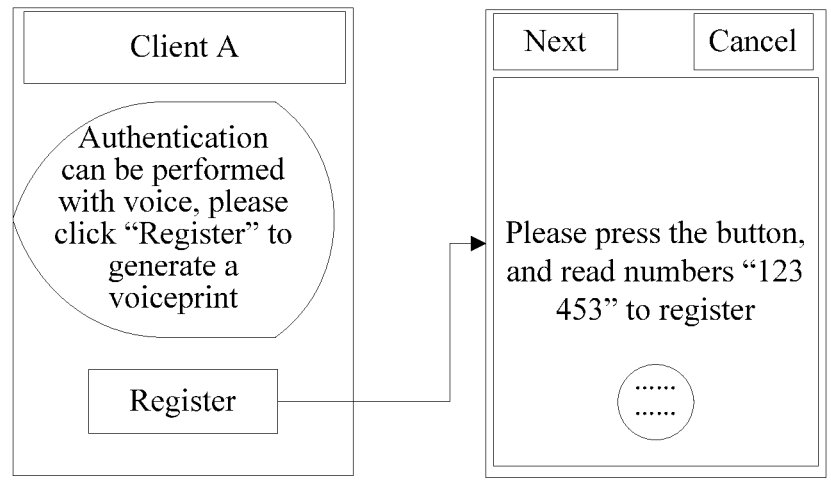
FIG. 5 is a schematic diagram of a client interface guiding a user to set a voiceprint according to an embodiment of the present disclosure.

After it is determined that the terminal where the client is located is a pre-certified safety device, an option for guiding a user to set a voiceprint may be provided after it is detected that the client successfully logs in to the safety device, and an operation of selecting the option is detected, to guide the user to set a voiceprint, in the process of obtaining registration voice data of a legal user operating the client. Reference is made to FIG. 5, which is a schematic diagram of a client interface guiding a user to set a voiceprint.

In step two, if the terminal where the client is located is a pre-certified safety device, second preset text information is transmitted to the client.

Content of the second preset text information is not limited in the embodiment of the present disclosure. In an implementation, the second preset text information includes but is not limited to: number, verse, letter, and Chinese character. According to an embodiment of the disclosure, characters constituting the first preset text information include at least one character in the second preset text information.

In step three, the client receives the second preset text information transmitted by the server, obtains second voice data (i.e., registration voice data) inputted by the legal user based on the second preset text information, and submits the second voice data to the server.

In step four, the server receives the second voice data submitted by the client, and determines whether the second voice data meets a preset condition.

The preset condition may be whether duration of the second voice data reaches a preset time length.

In step five, if the server determines that the second voice data meets the preset condition, the second voice data meeting the preset condition is determined as the registration voice data of the legal user operating the client.

Optionally, if the server determines that the second voice data does not meet the preset condition, the following steps may be performed to obtain second voice data meeting the preset condition.

In step six, the server transmits first prompt information for recording voice data again to the client.

Figure 6:
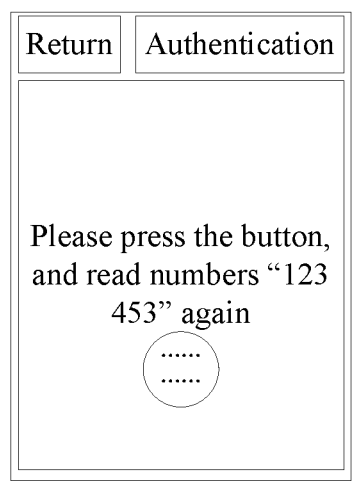
FIG. 6 is a schematic diagram of a client interface displaying first prompt information according to an embodiment of the present disclosure.

The manner that the server transmits the first prompt information for recording the voice data again to the client is not limited in the embodiment of the present disclosure. The first prompt information includes the second preset text information, to enable the legal user to input second voice data again based on the second preset text information included in the first prompt information and then enable the client to obtain the second voice data inputted by the legal user based on the first prompt information. Reference is made to FIG. 6, which is a schematic diagram of a terminal interface displaying first prompt information.

In step seven, the client receives the first prompt information transmitted by the server, obtains the second voice data inputted by the legal user based on the first prompt information, and submits the second voice data inputted by the legal user based on the first prompt information to the server.

The manner that the client receives the first prompt information transmitted by the server is not limited in the embodiment of the present disclosure. In addition, the client may display the received first prompt information, to enable the legal user to input the second voice data again based on the second preset text information according to the displayed first prompt information.

In step eight, the server receives the second voice data inputted by the legal user again based on the first prompt information, determines whether the second voice data inputted by the legal user based on the first prompt information meets the preset condition. If the preset condition is not met, the process goes to step six, until second voice data meeting the preset condition is obtained. The second voice data meeting the preset condition is taken as the registration voice data of the legal user operating the client.

After the registration voice data of the legal user operating the client is obtained, the registration voiceprint of the legal user operating the client may be generated based on the obtained registration voice data of the legal user operating the client.

In order to make the generated voiceprint of the legal user operating the client more accurate, registration voice data of the legal user operating the client may be obtained for many times. Therefore, the following steps may be included.

In step nine, the server transmits second prompt information for obtaining voice data again to the client.

Figure 7:
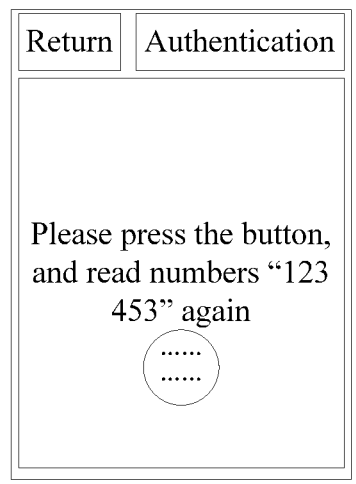
FIG. 7 is a schematic diagram of a client interface displaying second prompt information according to an embodiment of the present disclosure.

The second prompt information includes the second preset text information, to enable the legal user to input the voice data again based on the second prompt information and then enable the client to obtain third voice data inputted by the legal user based on the second preset text information. Reference is made to FIG. 7, which is a schematic diagram of a client interface displaying second prompt information.

In step ten, the client receives the second prompt information transmitted by the server, obtains the third voice data inputted by the legal user based on the second prompt information, and submits the third voice data to the server.

In step eleven, the server receives the third voice data submitted by the client, and determines whether the third voice data meets a preset condition.

In step twelve, if the server determines that the third voice data meets the preset condition, the server determines whether the second voice data meeting the preset condition is consistent with the third voice data meeting the preset condition.

In order to determine whether the obtained two pieces of voice data of the legal user are from a same user, or determine whether the obtained two pieces of voice data of the legal user are related, the server determines whether the second voice data meeting the preset condition is consistent with the third voice data meeting the preset condition. The manner that the server determines whether the second voice data meeting the preset condition is consistent with the third voice data meeting the preset condition includes but is not limited to determining a similarity between the second voice data meeting the preset condition and the third voice data meeting the preset condition. If the similarity between the second voice data meeting the preset condition and the third voice data meeting the preset condition reaches a preset threshold, it is determined that the second voice data meeting the preset condition is consistent with the third voice data meeting the preset condition. Alternatively, whether the second voice data meeting the preset condition is consistent with the third voice data meeting the preset condition may be determined in other ways, which are not limited in the embodiments of the present disclosure.

In step thirteen, if the server determines that the second voice data meeting the preset condition is consistent with the third voice data meeting the preset condition, the second voice data meeting the preset condition and the third voice data meeting the preset condition are taken as the obtained registration voice data of the legal user, and a registration voiceprint of the legal user is generated based on the second voice data meeting the preset condition and the third voice data meeting the preset condition.

For example, the second voice data meeting the preset condition and the third voice data meeting the preset condition may be spliced together, and the spliced voice data is taken as the registration voice data of the legal user, thereby generating a registration voiceprint based on the registration voice data.

Figure 8:
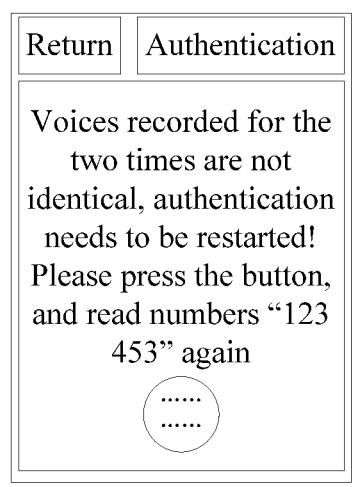
FIG. 8 is a schematic diagram of a client interface displaying third prompt information according to an embodiment of the present disclosure.

Optionally, if the server determines that the second voice data meeting the preset condition is not consistent with the third voice data meeting the preset condition, the server may request the client to obtain registration voice data of the legal user again from the beginning. Specifically, the server may transmit third prompt information for obtaining second voice data again to the client. The client obtains voice data inputted by the legal user again based on the third prompt information and transmits the second voice data inputted by the legal user based on the second preset text information to the server, then the server proceeds to step four and obtains the registration voice data of the legal user again from step four, until second voice data meeting the preset condition and third voice data meeting the preset condition are obtained and the second voice data meeting the preset condition is consistent with the third voice data meeting the preset condition. Reference is made to FIG. 8, which is a schematic diagram of a client interface displaying third prompt information.

Figure 9:
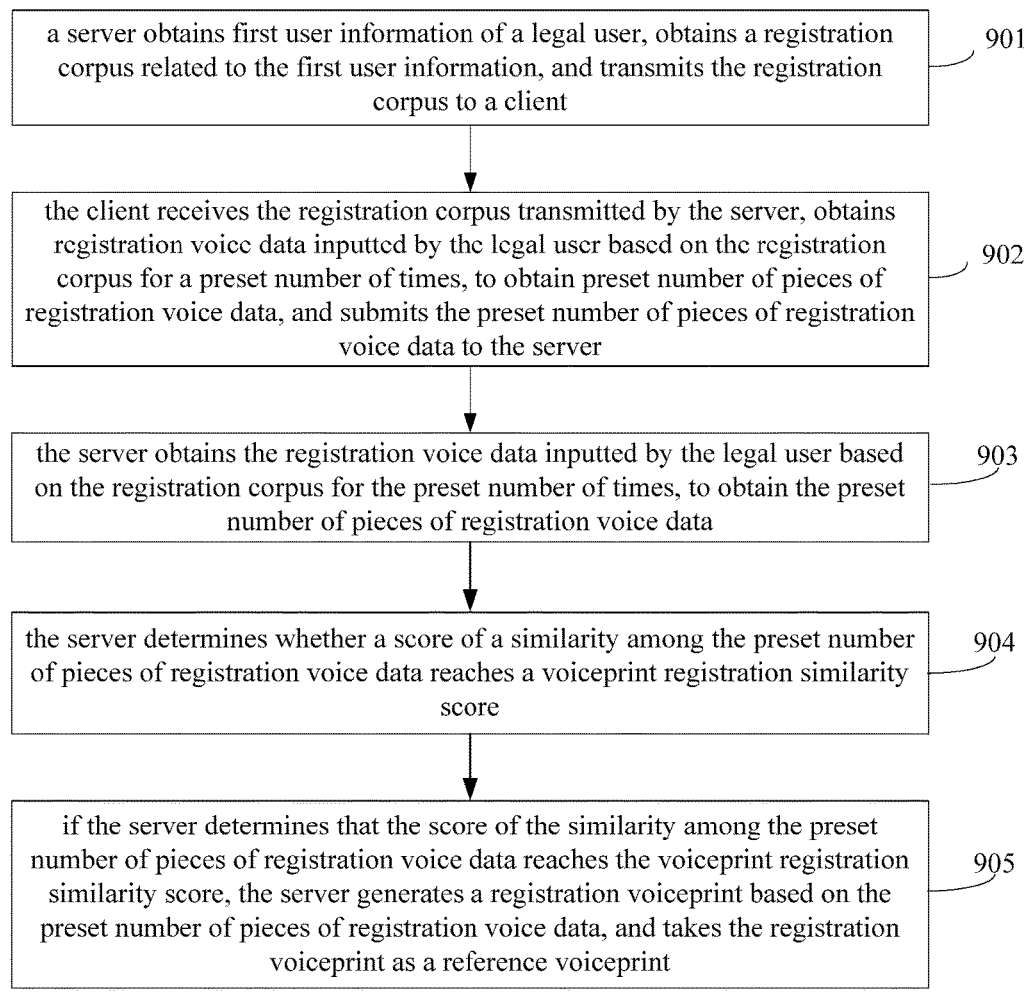
FIG. 9 is a flow chart of a method for generating a registration voiceprint according to an embodiment of the present disclosure.

Another method for generating a registration voiceprint is provided according to an embodiment of the present disclosure, as shown in FIG. 9. The method includes but is not limited to steps 901 to 905.

In step 901, a server obtains first user information about a legal user, obtains a registration corpus related to the first user information, and transmits the registration corpus to a client.

In order to ensure that in the process of generating the registration voiceprint, the registration corpus shown to the legal user includes content that the legal user is interested in, the server may obtain the first user information about the legal user and obtain the registration corpus related to the first user information, thereby transmitting the registration corpus related to the user information to the client.

Content of the first user information is not limited by the embodiment of the present disclosure. In an implementation, the first user information includes but is not limited to information about interest and region of the legal user. For example, if the legal user is interested in mathematics, the registration corpus issued by the server may be numbers. As another example, if the legal user is British, the registration corpus issued by the server may be an English letter, an English phrase, or an English sentence.

Content of the registration corpus is not limited in the embodiment of the present disclosure. In an implementation, the registration corpus may be a poem, a random number, a random letter, a random combination of words, or a quote. For example, the registration corpus may be ten numbers "0-9", a verse of "the day ends with the sun setting into the west mount, the Yellow River ends with it flowing into the east sea", or letters from A to H. The registration corpus may also be a combination of at least two of a poem, a random number, a random letter, a random word and a quote.

The manner that the server transmits the registration corpus to the client is not limited in the embodiment of the present disclosure. The server transmits the registration corpus related to the first user information to the client based on the first user information about the legal user, so that different users can use different registration corpora. In this way, the manner of selecting the registration corpus is flexible, and the difference between the subsequently generated registration voiceprints is great, which facilitates the subsequent voiceprint verification.

It should be noted that, the content of the registration corpus is related to the content of the verification corpus issued in the subsequent process of voiceprint verification with the registration voiceprint as a reference voiceprint. Specifically, the verification corpus may a character string identical with all characters in the registration corpus, a character string identical with some characters in the registration corpus, a character string consisting of all characters in the registration corpus in a reverse order, a character string consisting of some characters in the registration corpus in a reverse order, a character string consisting of all characters in the registration corpus out of order, a character string consisting of some characters in the registration corpus out of order, or a character string formed by repeating at least one character in the registration corpus.

For example, if the registration corpus is ten numbers "0-9", the verification corpus may be the ten numbers "0-9", arbitrary numbers in the ten numbers "0-9" such as "0-7" or "02468", a character string consisting of all or some numbers in the ten numbers "0-9" in a reverse order such as "9-0", "7-0" or "86420", a character string consisting of all or some numbers in the ten numbers "0-9" out of order such as "3698521470" or "257369", or a character sting formed by repeating at least one character in the verification corpus such as "000 111" or "115577". Possible implementations of the verification corpus in a case that the registration corpus is in a form of numbers are illustrated. In an implementation, the verification corpus is similarly implemented in a case that the registration corpus is in a form of a combination of texts such as letter, number and poem, the detailed description thereof is omitted herein.

The process of generating the registration voiceprint is triggered by obtaining the first user information about the legal user and obtaining the registration corpus related to the first user information. The registration corpus is a corpus related to the first user information about the legal user, therefore, registration voice data inputted by the legal user based on the registration corpus related to the first user information about the user can be obtained successfully, which improves the success rate of generating a voiceprint and enables the voiceprint generation method to be more flexible.

In step 902, the client receives the registration corpus transmitted by the server, obtains the registration voice data inputted by the legal user based on the registration corpus for a preset number of times to obtain the preset number of pieces of registration voice data, and submits the preset number of pieces of registration voice data to the server.

The principle that the client receives the registration corpus transmitted by the server and obtains the registration voice data inputted by the legal user based on the registration corpus for the preset number of times, is identical to that of the step 403 where the client receives the verification instruction carrying the verification corpus, which is transmitted by the server based on the service operation request, and obtains the verification voice data which is inputted by the current user operating the client based on the verification corpus. Content in the step 403 can be referred to for details, which is omitted herein.

It should be noted that, in order to make the generated registration voiceprint more accurate to facilitate the subsequent voiceprint verification based on the generated registration voiceprint, the client may obtain the registration voice data inputted by the legal user based on the registration corpus for a preset number of times, to obtain the preset number of pieces of registration voice data of the legal user. The value of the preset number of times is not limited in the embodiment of the present disclosure. In an implementation, the value of the preset number of times may be set as needed. In order to make the generated registration voiceprint more accurate and make the reliability of voiceprint verification higher, the preset number of times may be two times, or may be three times, for example.

The manner of submitting the preset number of pieces of registration voice data to the server is not limited in the embodiment of the present disclosure. In an implementation, since the voice data is usually large, the registration voice data obtained each time may be divided into several pieces before the registration voice data is submitted. Therefore, in the process of submitting the preset number of pieces of registration voice data to the server, the registration voice data inputted by the legal user based on the registration corpus each time may be sliced for a preset number of times, and the registration voice data inputted by the legal user based on the registration corpus each time is submitted to the service in a form of slice, so that the service obtains the registration voice data inputted by the legal user based on the registration corpus each time in a form of slice for the preset number of times, and combines the registration voice data inputted by the legal user based on the registration corpus each time to obtain the preset number of pieces of registration voice data inputted by the legal user based on the registration corpus.

The principle of submitting the registration voice data inputted by the legal user based on the registration corpus each time to the service in a form of slice is identical with that of the step 403 where the client submits the verification voice data to the server. Content in the step 403 can be referred to for details, which is omitted herein.

Optionally, in order to ensure that the registration voice data of the legal user can be obtained in a quiet environment without being disturbed by ambient noise or other noise, and to ensure that the quality of the obtained voice data of the legal user is high, the client, before obtaining the registration voice data inputted by the legal user based on the registration corpus, may detect whether an ambient voice volume meets a condition for obtaining the registration voice data; if the ambient voice volume meets the condition for obtaining the registration voice data, obtain the registration voice data inputted by the legal user based on the registration corpus; and if the ambient voice volume does not meet the condition for obtaining the registration voice data, transmit prompt information to the client to prompt the user that the condition for obtaining the registration voice data is not met currently and a quiet environment is required for obtaining the registration voice data. The manner of transmitting the prompt information to the client is not limited in the embodiment of the present disclosure.

The manner that the client detects whether the ambient voice volume meets the condition for obtaining the registration voice data includes but is not limited to: detecting whether the ambient voice volume reaches a preset threshold, and if the ambient voice volume does not reach the preset threshold, determining that the ambient voice volume meets the condition for obtaining the registration voice data. The ambient voice may be ambient noise or may be voices of other users. The value of the preset threshold for the ambient voice volume is not limited in the embodiment of the present disclosure. In an implementation, the value of the preset threshold may be set as needed.

In addition, in order to ensure that the obtained registration voice data is voice data of the legal user, the client, before obtaining the registration voice data inputted by the legal user based on the registration corpus for the preset number of times, detects whether a device where the client is located is a pre-certified safety device. If the device where the client is located is a pre-certified safety device, it is determined that the registration voice data of the legal user can be obtained.

In an implementation, the manner of detecting whether the device where the client is located is a pre-certified safety device includes but is not limited to obtaining an identifier of a terminal where the client is located and comparing the identifier of the terminal where the client is located with an identifier of a pre-certified safety device. The obtained identifier of the terminal where the client is located includes but is not limited to an IMEI (International Mobile Equipment Identification Number) of the terminal where the client is located. In addition, in the process of obtaining the voice data of the legal user of the client, a current user operating the client is determined as the legal user operating the client by default if it is detected that the terminal where the client is located is a pre-certified safety device.

Furthermore, before detecting whether the terminal where the client is located is a pre-certified safety device, the server authenticates a safety device in advance. In an implementation, the manner that the server authenticates a safety device in advance includes but is not limited to determining whether the number of times that the client successfully logs in to a terminal reaches a preset number of times. If it is determined that the number of times that the client successfully logs in to the terminal reaches the preset number of times, the terminal is authenticated as a safety device. The value of the preset number of times is not limited in the embodiment of the present disclosure. In an implementation, the greater the preset number of times is, the higher reliable the authenticated safety device is.

In step 903, the server obtains the registration voice data inputted by the legal user based on the registration corpus for the preset number of times, to obtain the preset number of pieces of registration voice data.

The manner that the server obtains the registration voice data inputted by the legal user based on the registration corpus for the preset number of times includes but is not limited to: in a case that the client obtains the registration voice data inputted by the legal user based on the registration corpus for the preset number of times and submits the obtained registration voice data for the preset number of times, the server receives the registration voice data submitted by the client each time for the preset number of times, and takes the registration voice data received each time as the obtained registration voice data inputted by the legal user based on the registration corpus, thereby obtaining the preset number of pieces of registration voice data.

Optionally, in order to determine whether the obtained registration voice data can be used as voice data for generating the registration voiceprint, the server, after obtaining the registration voice data each time, may determine whether the registration voice data obtained each time meets a preset condition. Content of the preset condition is not limited in the embodiment of the present disclosure. In an implementation, the preset condition may be whether duration of the registration voice data reaches a preset time period. It should be noted that, in a case that the preset condition is whether the duration of the registration voice data reaches a preset time period, the preset time period is set considering the content of the registration corpus. For example, if it is determined by statistics that a normal user needs 30 s (seconds) to read the registration corpus, the preset time period may be set to be 25 s. In this case, if it is determined that the duration of the registration voice data reaches 25 s, it is determined that the registration voice data meets the preset condition.

If the obtained preset number of pieces of registration voice data do not meet the preset condition, prompt information for obtaining registration voice data inputted by the legal user based on the registration corpus again may be issued to the client, to cause the legal user to input the registration voice data again based on the prompt information, until it is determined by the server that the obtained preset number of pieces of registration voice data meet the preset condition.

In step 904, the server determines whether a score of a similarity among the preset number of pieces of registration voice data reaches a voiceprint registration similarity score.

After the preset number of pieces of registration voice data are obtained, the server determines whether the score of the similarity among the preset number of pieces of registration voice data reaches the voiceprint registration similarity score, to determine whether the obtained preset number of pieces of registration voice data can be used to generate the registration voiceprint. The value of the voiceprint registration similarity score is not limited in the embodiment of the present disclosure. In an implementation, the value of the voiceprint registration similarity score may be set by experience. The greater the value of the voiceprint registration similarity score is, the more reliable that the registration voiceprint is used as a reference in the subsequent voiceprint verification.

The server, before determining whether the score of the similarity among the preset number of pieces of registration voice data reaches the voiceprint registration similarity score, calculates the score of the similarity among the preset number of pieces of registration voice data. The principle of calculating the score of the similarity among the preset number of pieces of registration voice data is identical with that of calculating the score of the similarity between the verification voiceprint and the reference voiceprint in the step 405. Content in the step 405 can be referred to for details, which is omitted herein.

The manner that the server determines whether the score of the similarity among the preset number of pieces of registration voice data reaches the voiceprint registration similarity score includes but is not limited to: after the score of the similarity among the preset number of pieces of registration voice data is calculated, comparing the score of the similarity among the preset number of pieces of registration voice data with the preset voiceprint registration similarity score.

It should be noted that, there may be different ways to determine whether the score of the similarity among the preset number of pieces of registration voice data reaches the voiceprint registration similarity score, considering different values of the preset number. For example, if the preset number of times is two times, the number of pieces of registration voice data obtained by the server is two. In this case, whether the score of the similarity among the preset number of pieces of registration voice data reaches the voiceprint registration similarity score is determined by determining whether the score of the similarity between the two pieces of registration voice data reaches the voiceprint registration similarity score.

As another example, in a case that the preset number is greater than two, such as three or four, then in the process of determining whether the score of the similarity among the preset number of pieces of registration voice data reaches the voiceprint registration similarity score, the score of the similarity between every two pieces of the registration voice data may be calculated, and it is determined that the score of the similarity among the preset number of pieces of registration voice data reaches the voiceprint registration similarity score if the scores of the similarity between every two pieces of registration voice data all reach the voiceprint registration similarity score.

Alternatively, in a case that the preset number is greater than two, whether the score of the similarity among the preset number of pieces of registration voice data reaches the voiceprint registration similarity score may be determined based on the number of scores of the similarity between every two pieces of the registration voice data that reach the voiceprint registration similarity score. If the number of the scores of the similarity between every two pieces of registration voice data that reach the voiceprint registration similarity score is greater than a preset threshold, it is determined that the score of the similarity among the preset number of pieces of registration voice data reaches the voiceprint registration similarity score. For example, in a case that the preset number is three and it is determined that the number of the scores of the similarity between every two pieces of registration voice data that reach the voiceprint registration similarity score is greater than two, then it is determined that the score of the similarity among the three pieces of registration voice data reaches the voiceprint registration similarity score.

In step 905, if the server determines that the score of the similarity among the preset number of pieces of registration voice data reaches the voiceprint registration similarity score, the server generates the registration voiceprint based on the preset number of pieces of registration voice data, and takes the registration voiceprint as the reference voiceprint.

The manner that the server generates the registration voiceprint based on the preset number of pieces of registration voice data includes but is not limited to: splicing the preset number of pieces of registration voice data and generating the registration voiceprint based on the spliced registration voice data.

Specifically, generating the registration voiceprint based on the spliced registration voice data may be realized by using a voiceprint generation algorithm, and the principle thereof is identical with that of generating the verification voiceprint based on the verification voice data in the step 404. Content in the step 404 can be referred to for details, which is omitted herein. After the registration voiceprint is generated, voiceprint verification can be subsequently performed by using the generated registration voiceprint as reference. Therefore, the registration voiceprint may be taken as the reference voiceprint.

Optionally, if the legal user wants to change the registration voiceprint after the registration voiceprint is generated, new registration voice data of the legal user may be obtained and new registration voiceprint is generated based on the new registration voice data of the legal user by using the above five steps.

It should be noted that, in the process of generating the registration voiceprint again, registration corpus transmitted by the server to the client may be different from the previous registration corpus used for registering the voiceprint. In this way, registration corpus of the user can be enriched, and different registration corpora can be transmitted to the client in the process of voiceprint verification, thereby good user experience during the voiceprint registration can be achieved by issuing different registration corpora to the user.

In addition, after the registration voiceprint is generated, the client may initiate a preliminary voiceprint verification process, to detect whether the voiceprint verification can be performed. The manner of the preliminary voiceprint verification process is not limited in the embodiment of the present disclosure. In an implementation, the preliminary voiceprint verification process includes but is not limited to: providing an option for trying voiceprint verification on a client page, and after it is detected that the option for trying voiceprint verification is selected, transmitting a verification corpus from the server to the client and performing the preliminary voiceprint verification process based on the steps 401 to 406 according to the embodiment of the present disclosure.

Optionally, after the registration voiceprint is generated by the server based on the spliced registration voice data, the registration corpus, the preset number of pieces of registration voice data and the registration voiceprint may be stored and a mapping among the registration corpus, the preset number of pieces of registration voice data and the registration voiceprint may be formed, to evolve the registration voiceprint by the registration voice data subsequently and expand content of the registration corpus. The manner of storing the registration corpus, the preset number of pieces of registration voice data and the registration voiceprint is not limited in the embodiment of the present disclosure. In an implementation, in order to ensure the security of the mapping among the registration corpus, the preset number of pieces of registration voice data and the registration voiceprint that are stored, the registration corpus, the preset number of pieces of registration voice data and the registration voiceprint may be encrypted, and the registration corpus, the preset number of pieces of registration voice data and the registration voiceprint that are encrypted are stored.

The manner of encrypting the registration corpus, the preset number of pieces of registration voice data and the registration voiceprint is not limited in the embodiment of the present disclosure. The form of a password used for encryption is also not limited in the embodiment of the present disclosure. In an implementation, the password may be in a form of number or pattern.

Reference is made to Table 2, which is a schematic table of a mapping among the registration corpus, the preset number of pieces of registration voice data and the registration voiceprint that are stored.

TABLE 2

| registration corpus | the preset number of pieces of registration voice data | registration voiceprint |
|---|---|---|
| 0123456789 | registration voice data 1, registration voice data 2 . . . | frequency 85, wavelength 70 . . . |

Content of the above Table 2 is only described for illustration, and is not limitation to the embodiment of the present disclosure.

According to an embodiment of the present disclosure, in order to ensure that the verification voice data used in the voiceprint verification process can be used as voice data for generating an evolution voiceprint in a subsequent reference voiceprint evolution process, the server may store the verification voice data and attribute information about the verification voice data after the voiceprint verification for the current user is passed, so that the verification voice data and the attribute information about the verification voice data can be used as reference for screening evolution voice data in a subsequent reference voiceprint evolution process. Furthermore, as the number of times of voiceprint verification increases, verification voice data used in voiceprint verification and attribute information about each piece of verification voice data may be stored each time the voiceprint verification is passed, so that the verification voice data used in each voiceprint verification and the attribute information about the verification voice data can be used as reference for screening evolution voice data in a subsequent reference voiceprint evolution process.

Content of the attribute information is not limited in the embodiment of the present disclosure. In an implementation, the attribute information at least includes duration of the verification voice data and a score of a similarity between the verification voiceprint generated based on the verification voice data and the reference voiceprint.

Figure 10:
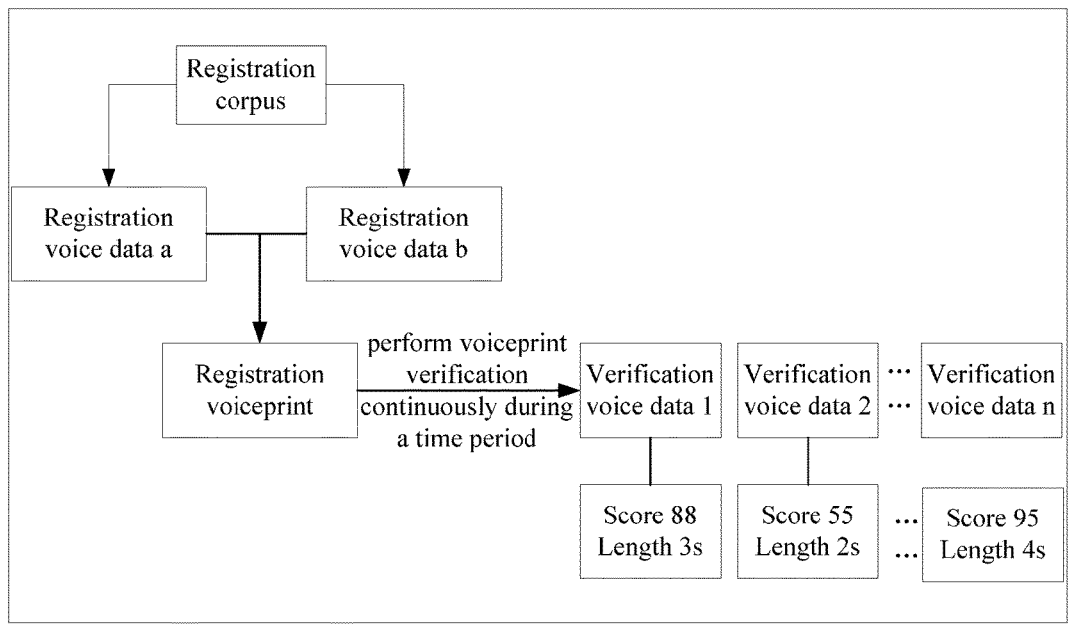
FIG. 10 is a schematic diagram of stored registration voice data, verification voice data stored each time voiceprint verification is passed in a period of time and attribute information corresponding to each piece of verification voice data according to an embodiment of the present disclosure.

Reference is made to FIG. 10, which is a schematic diagram of stored registration voice data, verification voice data stored each time voiceprint verification is passed in a period of time and attribute information corresponding to each piece of verification voice data. In FIG. 10, registration voice data a and registration voice data b are voice data of the legal user obtained based on the registration corpus in the process of generating the registration voiceprint. Verification voice data 1 to verification voice data n are verification voice data used in a process of voiceprint verification that are stored each time voiceprint verification is passed. A score of each piece of verification voice data is a score of a similarity between the verification voiceprint and the reference voiceprint in each voiceprint verification. A length of each piece of verification voice data is duration of the verification voice data. For example, "score" corresponding to the verification voice data 1 is a score of a similarity between the verification voice data 1 and the reference voiceprint in the process of voiceprint verification with the verification voice data 1, and "length 3 s (seconds)" corresponding to the verification voice data 1 is duration of the verification voice data 1.

According to an embodiment of the present disclosure, the method according to the embodiment of the present disclosure supports continuously evolving the reference voiceprint. Therefore, after the verification voice data and the attribute information about the verification voice data are stored, whether the reference voiceprint is to be evolved is determined. If the reference voiceprint is to be evolved, a preset number of pieces of evolution voice data may be screened out based on the attribute information about the verification voice data stored each time the voiceprint verification is passed, and an evolution registration voiceprint is generated based on the registration voice data and the evolution voice data. The evolution registration voiceprint is taken as a reference voiceprint of subsequent voiceprint verification.

There are multiple ways to determine whether the reference voiceprint is to be evolved. In an implementation, the way includes but is not limited to the following two ways.

In the first way, the client determines whether to evolve the reference voiceprint as needed. In an implementation, the manner that the client determines whether to evolve the reference voiceprint as needed includes but is not limited to the following steps.

In step one, the client determines whether the reference voiceprint is to be evolved. If it is determined that the reference voiceprint is to be evolved, the client transmits a voiceprint evolution request for evolving the reference voiceprint to the server.

The manner that the client determines whether the reference voiceprint is to be evolved includes but is not limited to determining whether a voiceprint evolution instruction of the legal user is obtained. If the client determines that the voiceprint evolution instruction of the legal user is obtained, it is determined that the reference voiceprint is to be evolved. The manner of obtaining the voiceprint evolution instruction of the legal user is not limited in the embodiment of the present disclosure. In an implementation, obtaining the voiceprint evolution instruction of the legal user includes but is not limited to providing a voiceprint evolution option on the client and determining whether the voiceprint evolution instruction is obtained by detecting whether the voiceprint evolution option is selected. If it is detected that the voiceprint evolution option is selected, it is determined that the voiceprint evolution instruction is obtained. If the voiceprint evolution option is not selected, it is determined that the voiceprint evolution instruction is not obtained. The manner of detecting whether the voiceprint evolution option is selected includes but is not limited to detecting whether the voiceprint evolution option is clicked, long pressed or double clicked.

The manner that the client transmits the voiceprint evolution request for evolving the reference voiceprint to the server is not limited in the embodiments of the present disclosure.

In step two, the server determines whether the voiceprint evolution request transmitted by the client is received. If the voiceprint evolution request transmitted by the client is received, the server determines that the reference voiceprint is to be evolved.

After the client determines that the reference voiceprint is to be evolved and transmits the voiceprint evolution request to the server to trigger the reference voiceprint evolution, the server determines whether to evolve the reference voiceprint by determining whether the voiceprint evolution request transmitted by the client is received. The server determines that the reference voiceprint is to be evolved by determining if the voiceprint evolution request transmitted by the client is received.

In the second way, the server triggers the reference voiceprint evolution. Specifically, the server determines whether a preset condition for automatically evolving the reference voiceprint is met. If the server determines that the preset condition for automatically evolving the reference voiceprint is met, the server determines that the reference voiceprint is to be evolved.

Content of the preset condition for automatically evolving the reference voiceprint is not limited in the embodiments of the present disclosure. In an implementation, the server may set that the reference voiceprint is automatically evolved in a case that a preset time interval is met, or in a case that a preset number of times of verification is met. Therefore, the preset condition for automatically evolving the reference voiceprint may be that the preset time interval for automatically evolving the reference voiceprint is met or the preset number of times of verification for automatically evolving the reference voiceprint is met. The values of the preset time interval and the preset number of times of verification are not limited in the embodiments of the present disclosure. In addition, the reference voiceprint evolution may be triggered by the client automatically as needed, which is not limited in the embodiments of the present disclosure.

The manner of screening out the preset number of pieces of evolution voice data based on the attribute information about the verification voice data stored after multiple times of voiceprint verification is passed is not limited in the embodiments of the present disclosure. In an implementation, the attribute information about the verification voice data at least includes the duration of the verification voice data and the score of the similarity between the verification voiceprint and the reference voiceprint, therefore, the preset number of pieces of evolution voice data may be screened out based on the duration of the verification voice data stored each time the voiceprint verification is passed and the score of the similarity between the verification voiceprint and the reference voiceprint.

In the process of screening out the evolution voice data based on the duration of the verification voice data, all the pieces of stored verification voice data and duration of each verification voice data may be obtained, and an average value is calculated for all the pieces of verification voice data and an average duration is obtained. In the process of screening out the evolution voice data, verification voice data with duration shorter than the average value may be filtered out. In the process of screening out the evolution voice data based on the score of the similarity between the verification voiceprint and the reference voiceprint, a preset threshold for the score of the similarity may be set, thereby filtering out verification voice data with the score of the similarity less than the preset threshold from all the pieces of verification voice data. After some of the verification voice data is filtered out based on the duration of the verification voice data and the score of the similarity between the verification voiceprint and the reference voiceprint, verification voice data meeting both the duration of the verification voice data and the score of the similarity between the verification voiceprint and the reference voiceprint may be screened out from the rest of the verification voice data and taken as the evolution voice data. It should be noted that, only the average duration of all the pieces of verification voice data is illustrated in the process of screening out the evolution voice data based on the duration of the verification voice data in the example. In an implementation, other duration may be used to screen out the evolution voice data, which is not limited in the embodiments of the present disclosure.

In the process of screening out the preset number of pieces of evolution voice data based on the attribute information about the verification voice data stored after multiple times of voiceprint verification are passed, the evolution voice data may be screened out based on only one type of attribute information. For example, the evolution voice data may be screened out based on only the duration of the verification voice data. In addition, in the process of evolving the reference voiceprint, the server may not screen out the evolution voice data but take all the verification voice data stored each time the voiceprint verification is passed as the evolution voice data.

Figure 11:
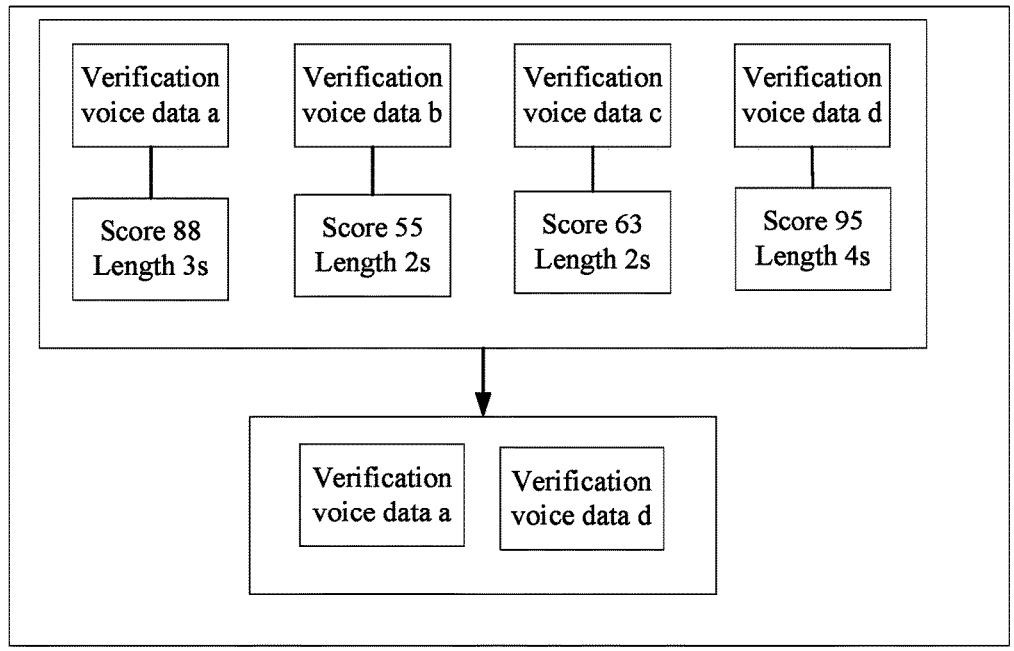
FIG. 11 is a schematic diagram of screening for evolution voice data according to an embodiment of the present disclosure.

Reference is made to FIG. 11, which is a schematic diagram of screening out evolution voice data. In FIG. 11, the verification voice data stored each time the voiceprint verification is passed includes verification voice data a, verification voice data b, verification voice data c and verification voice data d. In a case that the method for screening the voice data is filtering out verification voice data with duration shorter than 2 s, the verification voice data a and the verification voice data d are screened out based on the attribute information about each piece of verification voice data, to be taken as the evolution voice data.

The manner of generating the evolution registration voiceprint based on the registration voice data and the evolution voice data includes but is not limited to splicing the registration voice data and the evolution voice data, and generating the evolution registration voiceprint based on the spliced registration voice data and evolution voice data. The principle of splicing the registration voice data and the evolution voice data and the principle of generating the evolution registration voiceprint based on the spliced registration voice data and evolution voice data are identical with the principle of splicing the preset number of pieces of registration voice data in the process of generating the registration voiceprint and the principle of generating the registration voiceprint based on the preset number of pieces of registration voice data that are spliced. The principle of splicing the preset number of pieces of registration voice data and the principle of generating the registration voiceprint based on the preset number of pieces of registration voice data that are spliced can be referred to for details, which are omitted herein.

Figure 12:
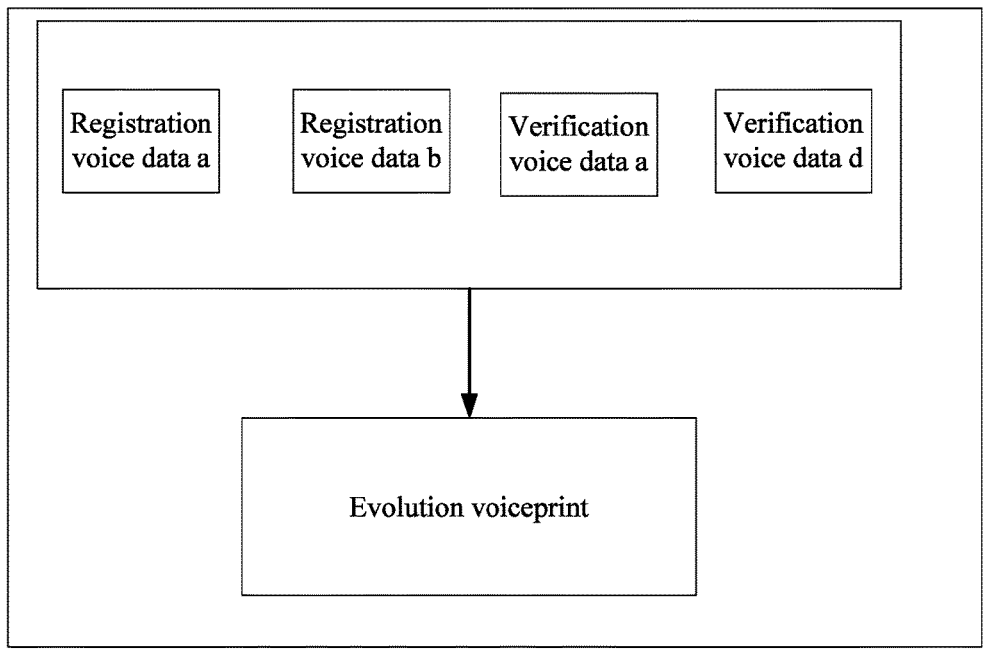
FIG. 12 is a schematic diagram of a process of generating an evolution voiceprint based on spliced registration voice data and evolution voice data according to an embodiment of the present disclosure.

Reference is made to FIG. 12, which is a schematic diagram of a process of generating an evolution voiceprint based on spliced registration voice data and evolution voice data. In FIG. 12, the registration voice data includes registration voice data a and registration voice data b, the evolution voice data screened out includes verification voice data a and verification voice data d. Therefore, in the process of generating the evolution voiceprint, the evolution voiceprint is generated based on the spliced registration voice data a, registration voice data b, verification voice data a and verification voice data d.

It should be noted that, as the number of times of operating the client increases, the number of times of voiceprint verification increases. Therefore, the verification voice data used in each passed voiceprint verification may be stored continuously and the reference voiceprint may be evolved continuously. In this way, a circulation of voiceprint verification, evolution voice data screening and voiceprint evolution is formed, which ensures reliability and accuracy of the reference voiceprint used in voiceprint verification and ensures that the process of voiceprint verification has a high accuracy and a high recognition rate.

A computer readable storage medium is provided according to an embodiment of the present disclosure. The computer readable storage medium may be a computer readable storage medium included in a memory according to the above embodiment, or a standalone computer readable storage medium which is not assembled into a terminal. The computer readable storage medium stores one or more programs, that when executed by one or more processors, is configured to perform the identity authentication method.

Figure 13:
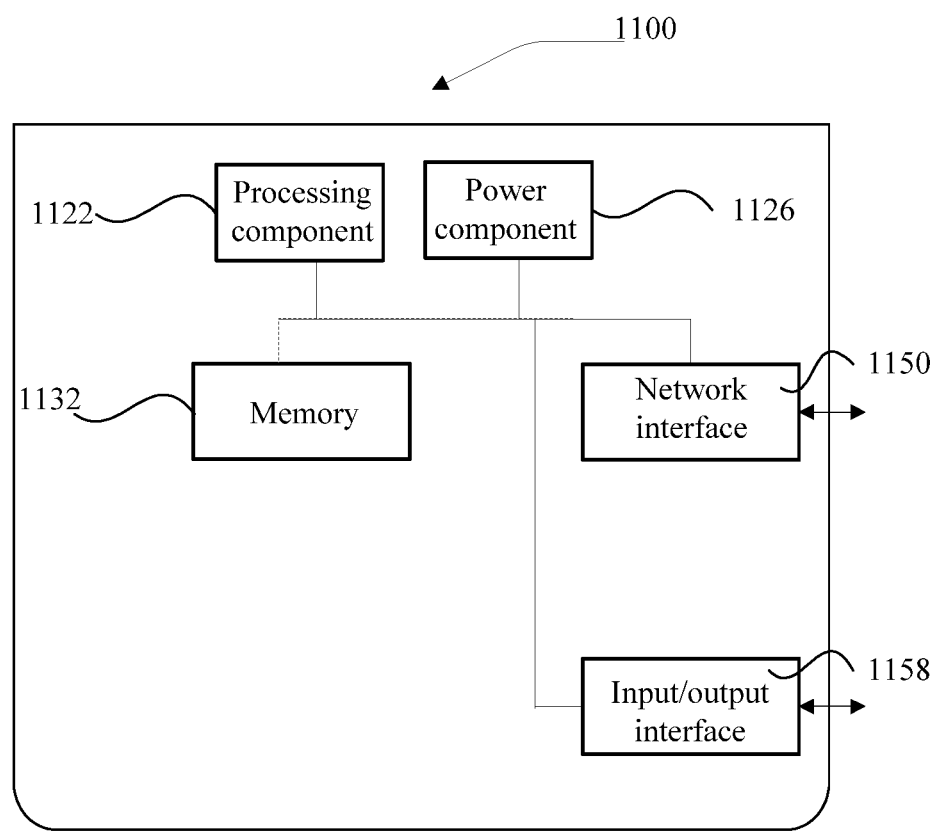
FIG. 13 is a schematic structural diagram of a server according to an embodiment of the present disclosure.

FIG. 13 is a schematic structural diagram of a server according to an embodiment of the present disclosure. As shown in FIG. 13, the server 1100 includes a processing component 1122 which further includes one or more processors, and a memory resource represented by a memory 1132 which is configured to store instructions that can be executed by the processing component 1122, such as an application. An application stored in the memory 1132 may include one or more modules each of which corresponds to a set of instructions. In addition, the processing component 1122 is configured to execute the instructions to perform functions performed by a server in the method according to any one of the above embodiments.

The server 1100 may further include a power component 1126 configured to perform power management of the server 1100, a wireless or wired network interface 1150 configured to connect the server 1100 to a network, and an input/output (I/O) interface 1158. The server 1100 may operate based on an operating system stored in the memory 1132, such as Windows Server™, Mac OS X™, Unix™, Linux™, FreeBSD™ or the like. One or more programs are stored in the memory, and are configured to be executed by the one or more processors. The one or more programs include instructions for implementing the method of the above embodiments.

Figure 14:
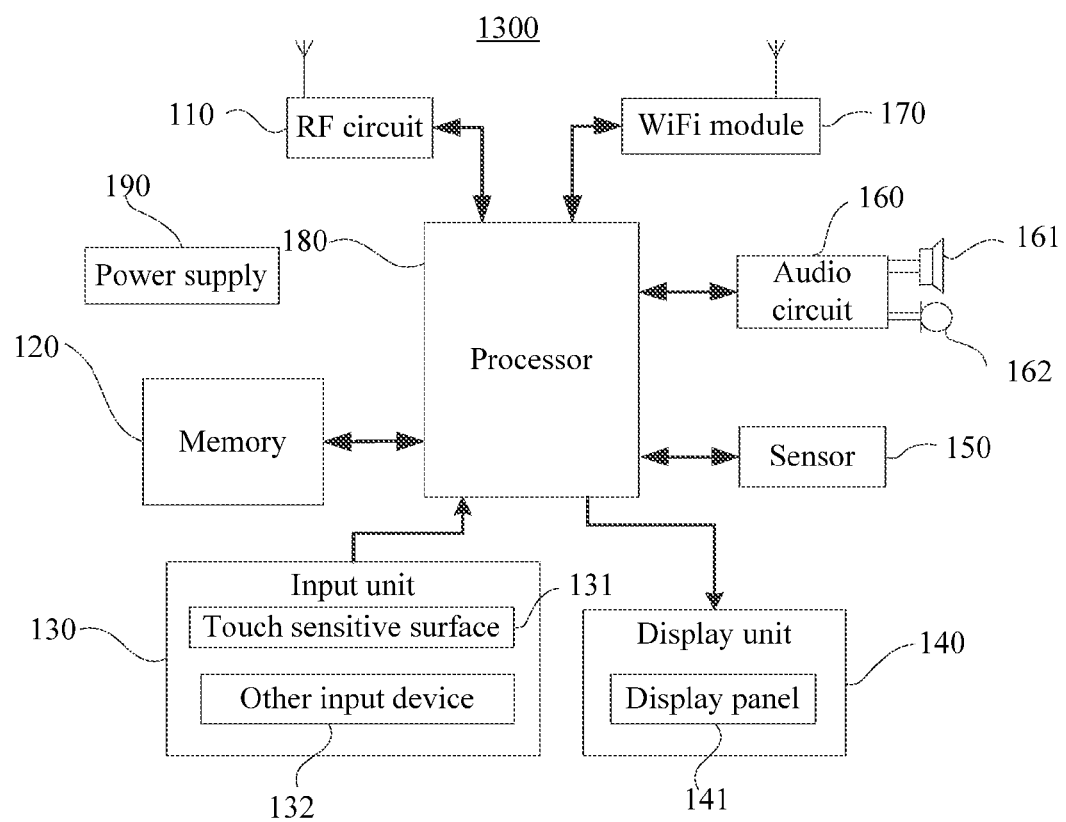
FIG. 14 is a schematic structural diagram of a terminal according to an embodiment of the present disclosure.

Reference is made to FIG. 14, which is a schematic structural diagram of a terminal. The terminal includes the client according to an embodiment of the present disclosure. The terminal 1300 may include a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, a power supply 190 and so on.

The RF circuit 110 may be configured to receive and transmit information, or to receive and transmit signals in a call. Generally, the RF circuit 110 includes but is not limited to an antenna, at least one amplifier, a tuner, one or more oscillators, a subscriber identity module (SIM) card, a transceiver, a coupler, a low noise amplifier (LNA), a duplexer. In addition, the RF circuit 110 may communicate with other devices and a network via wireless communication.

The memory 120 may be configured to store software programs and modules, and the processor 180 may execute various function applications and data processing by running the software programs and modules stored in the memory 120. The memory 120 may mainly include a program storage area and a data storage area. The program storage area may be used to store, for example, an operating system and an application required by at least one function (for example, a voice playing function, an image playing function). The data storage area may be used to store, for example, data established during the use of the terminal 1300 (for example, audio data, a telephone book). In addition, the memory 120 may include a high-speed random access memory and a nonvolatile memory, such as at least one magnetic disk memory, a flash memory, or other volatile solid-state memory.

The input unit 130 may be configured to receive input numeric or character information, and to generate a signal input of keyboard, mouse, action bars, optical ball or trackball related to user setting and function control. Specifically, the input unit 130 may include a touch sensitive surface 131 and other input device 132. Besides the touch sensitive surface 131, the input unit 130 may further include the other input device 132.

The display unit 140 may be configured to display information inputted by a user or information provided for the user and various graphic user interfaces of the terminal 1300. The graphic user interfaces may consist of graphs, text, icons, videos and any combination thereof. The display unit 140 may include a display panel 141 and the touch sensitive surface 131 covering the display panel 141. The terminal 1300 may further include at least one sensor 150, such as an optical sensor, a motion sensor and other sensors. The optical sensor may include an ambient light sensor and a proximity sensor.

The audio circuit 160, a loudspeaker 161 and a microphone 162 may provide an audio interface between the user and the terminal 1300. The audio circuit 160 may transmit an electric signal, converted from received audio data, to the loudspeaker 161, and a voice signal is converted from the electric signal and then outputted by the loudspeaker 161. On the other hand, the microphone 162 converts captured voice signal into an electric signal, the electric signal is received by the audio circuit 160 and converted into audio data. The audio data is outputted to the processor 180 for processing and then transmitted to another terminal via the RF circuit 110; or the audio data is outputted to the memory 120 for further processing.

WiFi is a short-range wireless transmission technique. The terminal 1300 may help the user to, for example, send and receive E-mail, browse a webpage and access a streaming media via the WiFi module 170, and provide wireless broadband Internet access for the user. Although the WiFi module 170 is shown in FIG. 14, it can be understood that the WiFi module 170 is not necessary for the terminal 1300, and may be omitted as needed within the scope of the essence of the present disclosure.

The processor 180 is a control center of the terminal 1300, and connects various parts of the terminal 1300 by various interfaces and wires, and implements various functions and data processing of the terminal 1300 by running or executing the software programs and/or modules stored in the memory 120 and invoking data stored in the memory 120, thereby monitoring the terminal 1300 as a whole. Optionally, the processor 180 may include one or more processing cores. Preferably, an application processor and a modem processor may be integrated into the processor 180. The application processor is mainly used to process, for example, an operating system, a user interface and an application. The modem processor is mainly used to process wireless communication. It can be understood that, the above modem processor may not be integrated into the processor 180.

The terminal 1300 also includes the power supply 190 (such as a battery) for powering various components. Preferably, the power supply may be logically connected with the processor 180 via a power management system, therefore, functions such as charging, discharging and power management are implemented by the power management system.

It can be understood by those skilled in the art that, all or some of the steps in the above embodiments may be implemented by hardware or by instructing related hardware with a program. The program may be stored in a computer readable storage medium. The storage medium may be a read-only memory, a magnetic disk or an optical disk, and so on.

The above are only preferred embodiments of the present disclosure, and the present disclosure is not limited hereto. Changes, equivalents and modifications made within the spirit and principle of the present disclosure fall within the protection scope of the present disclosure.

The invention claimed is:

1. A method for voiceprint verification, comprising:
receiving, by a processor, verification voice data associated with a verification corpus;
generating, by the processor, a verification voiceprint based on the verification voice data;
calculating a score of a similarity between the verification voiceprint and a pre-stored reference voiceprint according to a characteristic value of each of at least two characteristics of the verification voiceprint and the reference voiceprint and a weight of each of the at least two characteristics, wherein the at least two characteristics comprise at least two of a wavelength, a frequency, an intensity and a rhythm and correspond to at least two different weights;
determining, by the processor, whether the score of the similarity between the verification voiceprint and the reference voiceprint reaches a preset similarity score;
determining, by the processor, that the verification voiceprint is matched with the reference voiceprint, in a case that the score of the similarity between the verification voiceprint and the reference voiceprint reaches the preset similarity score;
storing the verification voice data and attribute information about the verification voice data, in a case that the verification voiceprint is determined to match with the reference voiceprint, the attribute information including a duration of the verification voice data and the score of the similarity between the verification voiceprint and the reference voiceprint;
selecting apiece of the stored verification voice data based on the attribute information; and
updating the reference voiceprint based on registration voice data and the selected piece of the stored verification voice data, the reference voiceprint being generated based on the registration voice data.

2. The method according to claim 1, wherein
the receiving the verification voice data associated with the verification corpus comprises:
receiving the verification voice data inputted by a user based on the verification corpus which is obtained by a client.

3. The method according to claim 2, wherein in a case that the verification voiceprint is matched with the reference voiceprint, identity authentication for the user is determined to be passed.

4. The method according to claim 1, further comprising:
receiving a service operation request carrying a service type,
wherein different service types correspond to different preset similarity scores, and
wherein the determining whether the score of the similarity between the verification voiceprint and the reference voiceprint reaches the preset similarity score comprises:
determining whether the score of the similarity between the verification voiceprint and the reference voiceprint reaches the preset similarity score corresponding to the service type.

5. The method according to claim 1, further comprising:
obtaining the registration voice data associated with a registration corpus; and
generating the reference voiceprint based on the registration voice data.

6. The method according to claim 5, further comprising:
detecting whether an ambient voice volume meets a condition for obtaining the registration voice data based on an ambient voice volume threshold.

7. The method according to claim 5, wherein
the verification corpus comprises a character string identical with at least some characters in the registration corpus, a character string consisting of at least some characters in the registration corpus in a reverse order, a character string consisting of at least some characters in the registration corpus out of order, or a character string formed by repeating at least one character in the registration corpus.

8. The method according to claim 5, wherein
the verification corpus comprises a character string including at least some characters in the registration corpus in a reverse order.

9. The method according to claim 1, further comprising:
obtaining user interest information;
obtaining a registration corpus related to the user interest information;
obtaining the registration voice data associated with the registration corpus for a preset number of times;
determining whether a score of a similarity among the registration voice data reaches a voiceprint registration similarity score; and
generating the reference voiceprint based on the registration voice data, in a case that the score of the similarity among the registration voice data reaches the voiceprint registration similarity score.

10. The method according to claim 1, further comprising:
receiving a service operation request carrying a service type transmitted by a client;
obtaining user information, and generating an electronic note based on the user information; and
transmitting a verification instruction carrying the verification corpus and the generated electronic note to the client based on the service operation request;
wherein the receiving the verification voice data associated with the verification corpus comprises:
receiving the electronic note submitted by the client, and the verification voice data inputted by a current user operating the client based on the verification corpus, which is obtained by the client; and
wherein the generating the verification voiceprint based on the verification voice data comprises:
determining whether the electronic note submitted by the client is consistent with the generated electronic note; and
generating the verification voiceprint based on the verification voice data, in a case that the electronic note submitted by the client is consistent with the generated electronic note.

11. An apparatus for voiceprint verification, comprising:
a memory; and
one or more processors,
wherein program instructions are stored in the memory, and the program instructions, when executed by the one or more processors, cause the apparatus to perform the following operations:
receiving verification voice data associated with a verification corpus;
generating a verification voiceprint based on the verification voice data;

calculating a score of a similarity between the verification voiceprint and a pre-stored reference voiceprint according to a characteristic value of each of at least two characteristics of the verification voiceprint and the reference voiceprint and a weight of each of the at least two characteristics, wherein the at least two characteristics comprise at least two of a wavelength, a frequency, an intensity and a rhythm and correspond to at least two different weights;

determining whether the score of the similarity between the verification voiceprint and the reference voiceprint reaches a preset similarity score;

determining that the verification voiceprint is matched with the reference voiceprint, in a case that the score of the similarity between the verification voiceprint and the reference voiceprint reaches the preset similarity score;

storing the verification voice data and attribute information about the verification voice data, in a case that the verification voiceprint is determined to match with the reference voiceprint, the attribute information including a duration of the verification voice data and the score of the similarity between the verification voiceprint and the reference voiceprint;

selecting a piece of the stored verification voice data based on the attribute information; and updating the reference voiceprint based on registration voice data and the selected piece of the stored verification voice data, the reference voiceprint being generated based on the registration voice data.

12. The apparatus according to claim 11, wherein the receiving the verification voice data associated with the verification corpus comprises:

receiving the verification voice data inputted by a user based on the verification corpus which is obtained by a client.

13. The apparatus according to claim 12, wherein in a case that the verification voiceprint is matched with the reference voiceprint, identity authentication for the user is determined to be passed.

14. The apparatus according to claim 11, wherein the operations further comprise receiving a service operation request carrying a service type, wherein different service types correspond to different preset similarity scores, and wherein the determining whether the score of the similarity between the verification voiceprint and the reference voiceprint reaches the preset similarity score comprises:

determining whether the score of the similarity between the verification voiceprint and the reference voiceprint reaches the preset similarity score corresponding to the service type.

15. The apparatus according to claim 11, wherein the operations further comprise:

obtaining the registration voice data associated with a registration corpus; and generating the reference voiceprint based on the registration voice data.

16. The apparatus according to claim 15, wherein the verification corpus comprises a character string including at least some characters in the registration corpus in a reverse order.

17. The apparatus according to claim 15, wherein the operations further comprise:

detecting whether an ambient voice volume meets a condition for obtaining the registration voice data based on an ambient voice volume threshold.

18. The apparatus according to claim 15, wherein the verification corpus comprises a character string identical with at least some characters in the registration corpus, a character string consisting of at least some characters in the registration corpus in a reverse order, a character string consisting of at least some characters in the registration corpus out of order, or a character string formed by repeating at least one character in the registration corpus.

19. The apparatus according to claim 11, wherein the operations further comprise:

obtaining user interest information;

obtaining a registration corpus related to the user interest information;

obtaining the registration voice data associated with the registration corpus for a preset number of times;

determining whether a score of a similarity among the registration voice data reaches a voiceprint registration similarity score; and generating the reference voiceprint based on the registration voice data, in a case that the score of the similarity among the registration voice data reaches the voiceprint registration similarity score.

20. The apparatus according to claim 11, wherein the operations further comprise:

receiving a service operation request carrying a service type transmitted by a client;

obtaining user information, and generating an electronic note based on the user information; and transmitting a verification instruction carrying the verification corpus and the generated electronic note to the client based on the service operation request;

wherein the receiving the verification voice data associated with the verification corpus comprises:

receiving the electronic note submitted by the client, and the verification voice data inputted by a current user operating the client based on the verification corpus, which is obtained by the client; and wherein the generating the verification voiceprint based on the verification voice data comprises:

determining whether the electronic note submitted by the client is consistent with the generated electronic note; and generating the verification voiceprint based on the verification voice data, in a case that the electronic note submitted by the client is consistent with the generated electronic note.

* * * * *